(12) United States Patent
Takahashi et al.

(10) Patent No.: US 11,762,691 B2
(45) Date of Patent: Sep. 19, 2023

(54) INFORMATION PROCESSING SYSTEM OF TASK SCHEDULING, METHOD OF TASK SCHEDULING, AND NON-TRANSITORY COMPUTER-READABLE STORAGE MEDIUM FOR STORING PROGRAM OF TASK SCHEDULING

(71) Applicant: FUJITSU LIMITED, Kawasaki (JP)

(72) Inventors: Eiichi Takahashi, Kawasaki (JP); Miwa Okabayashi, Sagamihara (JP); Akira Shiba, Kawasaki (JP); Naoki Nishiguchi, Kawasaki (JP); Hisatoshi Yamaoka, Kawasaki (JP); Kota Itakura, Kawasaki (JP); Takafumi Onishi, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 17/014,834

(22) Filed: Sep. 8, 2020

(65) Prior Publication Data

US 2021/0073030 A1 Mar. 11, 2021

(30) Foreign Application Priority Data

Sep. 11, 2019 (JP) .................................. 2019-165015

(51) Int. Cl.
*G06F 9/46* (2006.01)
*G06F 9/48* (2006.01)
(Continued)

(52) U.S. Cl.
CPC .............. *G06F 9/4887* (2013.01); *G06F 1/14* (2013.01); *G06F 9/485* (2013.01); *G06F 9/505* (2013.01)

(58) Field of Classification Search
CPC ......... G06F 9/4887; G06F 9/485; G06F 9/505
See application file for complete search history.

(56) References Cited

U.S. PATENT DOCUMENTS

| 2003/0087641 A1 | 5/2003 | Gustafsson |
| 2008/0307248 A1 | 12/2008 | Amano et al. |
| (Continued) | | |

FOREIGN PATENT DOCUMENTS

| JP | H05-204667 A | 8/1993 |
| JP | 2003-163975 A | 6/2003 |
| (Continued) | | |

OTHER PUBLICATIONS

Japanese Office Action dated Jun. 20, 2023 for corresponding Japanese Patent Application No. 2019-165015, with English Translation, 11 pages.

*Primary Examiner* — Gregory A Kessler
(74) *Attorney, Agent, or Firm* — Fujitsu Patent Center

(57) ABSTRACT

An information processing system includes: a storage device configured to store first clock time scheduled for execution of a task; and a processing device configured to: execute a task at second clock time earlier than first clock time scheduled for execution of the task; control the executing of the task not to execute the task at the first clock time when data used in the task is not updated in a period from the second clock time to the first clock time; and control the executing of the task to re-execute the task either at the first clock time or at third clock time earlier than the first clock time when the data is updated in the period from the second clock time to the first clock time.

9 Claims, 25 Drawing Sheets

(51) Int. Cl.
*G06F 1/14* (2006.01)
*G06F 9/50* (2006.01)

(56) References Cited

U.S. PATENT DOCUMENTS

| | | |
|---|---|---|
| 2011/0209152 A1 | 8/2011 | Camps et al. |
| 2013/0219406 A1 | 8/2013 | Hatabe et al. |
| 2013/0227585 A1 | 8/2013 | Ichikawa et al. |

FOREIGN PATENT DOCUMENTS

| | | |
|---|---|---|
| JP | 2006-091969 A | 4/2006 |
| JP | 2007-144699 A | 6/2007 |
| JP | 2011-529239 A | 12/2011 |
| JP | 2012-094030 | 5/2012 |
| JP | 2013-101523 A | 5/2013 |
| WO | 2005/106623 A1 | 11/2005 |
| WO | 2012/063339 A1 | 5/2012 |

FIG. 8

| EVENT PROBABILITY TABLE | 113 |
|---|---|
| TASK | EVENT PROBABILITY |
| Task1 | 0.8 |
| Task2 | 0.1 |
| Task3 | 0.5 |
| Task4 | 0.3 |
| ... | ... |

FIG. 10

| REFERENCE EVENT MANAGEMENT TABLE | 115 |
|---|---|
| TASK | REFERENCE EVENT |
| Task1 | e1,e2,e3 |
| Task2 | e4 |
| Task3 | e5,e6 |
| Task4 | e7,e8,e9 |
| ... | ... |

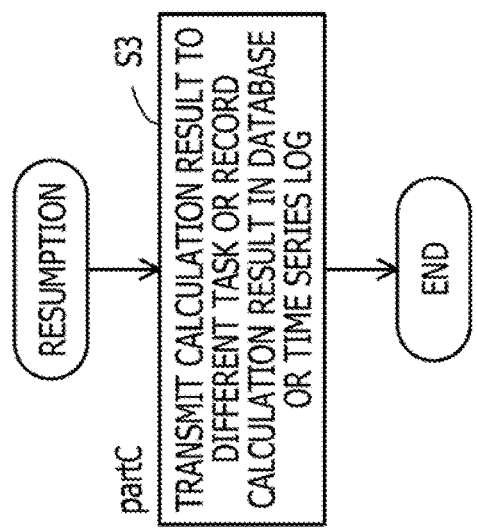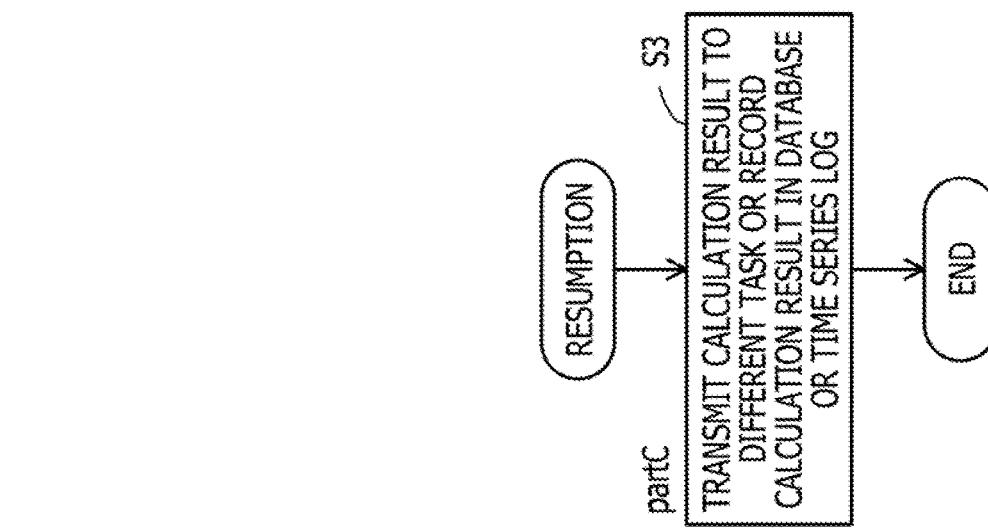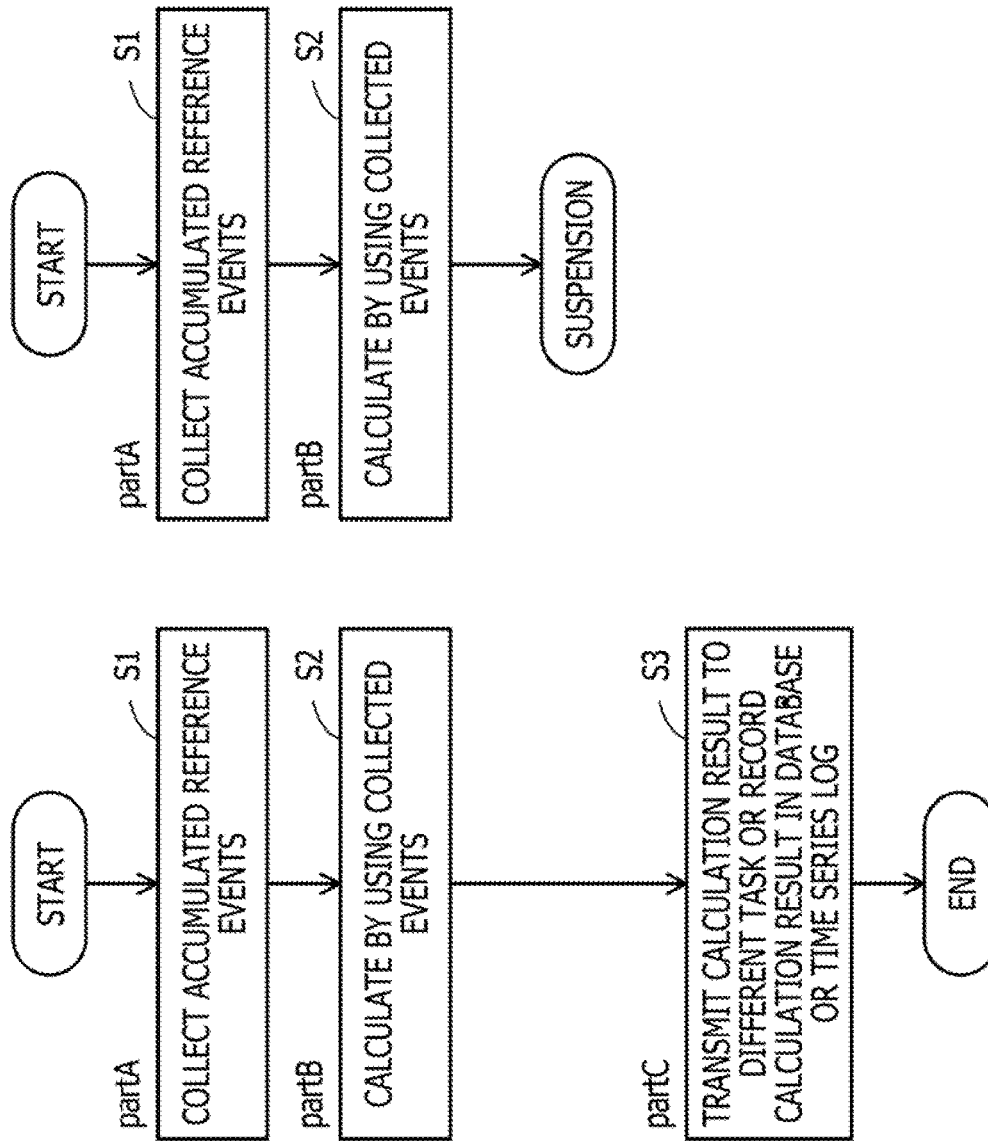

FIG. 17

| PARAMETER TABLE | | | 117 |
|---|---|---|---|
| TASK | q | L | |
| Task1 | 0.8 | 0.5 | |
| Task2 | 0.8 | 0.2 | |
| Task3 | 0.2 | 0.2 | |
| Task4 | 0.2 | 0.5 | |
| ... | ... | ... | |

FIG. 23

| EXECUTION SUSPENSION AVAILABILITY MANAGEMENT TABLE | | 118 |
|---|---|---|
| TASK | SUSPENSION/RESUMPTION AVAILABILITY | |
| Task1 | AVAILABLE | |
| Task2 | NOT AVAILABLE | |
| Task3 | AVAILABLE | |
| ... | ... | |

FIG. 24

| SPECULATIVELY EXECUTED TASK MANAGEMENT LIST | | 119 |
|---|---|---|
| TASK | STATE | |
| Task1 | STATE DATA d1 | |
| Task2 | STATE DATA d2 | |
| Task3 | STATE DATA d3 | |
| Task4 | STATE DATA d4 | |
| ... | ... | |

INFORMATION PROCESSING SYSTEM OF TASK SCHEDULING, METHOD OF TASK SCHEDULING, AND NON-TRANSITORY COMPUTER-READABLE STORAGE MEDIUM FOR STORING PROGRAM OF TASK SCHEDULING

CROSS-REFERENCE TO RELATED APPLICATION

This application is based upon and claims the benefit of priority of the prior Japanese Patent Application No. 2019-165015, filed on Sep. 11, 2019, the entire contents of which are incorporated herein by reference.

FIELD

The embodiments discussed herein are related to an information processing system, a method for information processing, and a non-transitory computer-readable storage medium for storing a program.

BACKGROUND

An information processing system may execute a variety of processing. For example, there has been proposed a computer system configured to cause a central processing unit (CPU) to execute a designated task in response to a task execution request generated at random. The proposed computer system includes a task execution control device which is configured to level out a load on the CPU in a case of intensive task execution requests by withholding immediate activation of a task having a low-priority rank even when the CPU is idle at a present time point and activating the task at a later time point when a load factor of the CPU is reduced.

There has also been proposed an information processing device which is configured to create schedule information by setting a date and time to activate a job so as not to overlap a date and time to activate each of other jobs within a period from an executable date and time to a deadline date and time, and to sequentially activate execution processing of the jobs that reach the dates and times set in the schedule information.

Moreover, there has also been proposed a processing request execution management apparatus which is configured to extract only a processing request from a certain customer in a guarantee time range from a queue when response time to the customer becomes longer than target response time, and to perform control in such a way as to reduce response time of the customer in the guarantee time range.

Examples of the related art include Japanese Laid-open Patent Publications Nos. 5-204667, 2006-91969, and 2013-101523 are examples of related art.

SUMMARY

According to an aspect of the embodiments, an information processing system includes: a storage device configured to store first clock time scheduled for execution of a task; and a processing device configured to: execute a task at second clock time earlier than first clock time scheduled for execution of the task; control the executing of the task not to execute the task at the first clock time when data used in the task is not updated in a period from the second clock time to the first clock time; and control the executing of the task to re-execute the task either at the first clock time or at third clock time earlier than the first clock time when the data is updated in the period from the second clock time to the first clock time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of an event probability table;
FIG. 10 illustrates an example of a reference event management table;
FIGS. 15A, 15B, and 15C illustrate an example of task suspension/resumption according to a third embodiment;
FIG. 17 illustrates an example of a parameter table according to a fourth embodiment;
FIG. 23 illustrates an example of an execution suspension availability management table;
FIG. 24 illustrates an example of a speculatively executed task management list.

DESCRIPTION OF EMBODIMENT(S)

In an information processing system, a given task that uses data accepted in a certain period may be scheduled to start execution at prescribed time. However, execution of two or more tasks may be scheduled at the prescribed time. In this case, an excessive load may be imposed on the information processing system at the prescribed time.

An object of an aspect of the present invention is to provide an information processing system, a method for information processing, and an information processing program, which are capable of suppressing concentration of a load at specified time.

Embodiments will be described below with reference to the drawings.

First Embodiment

A first embodiment will be described.

Figure 1:
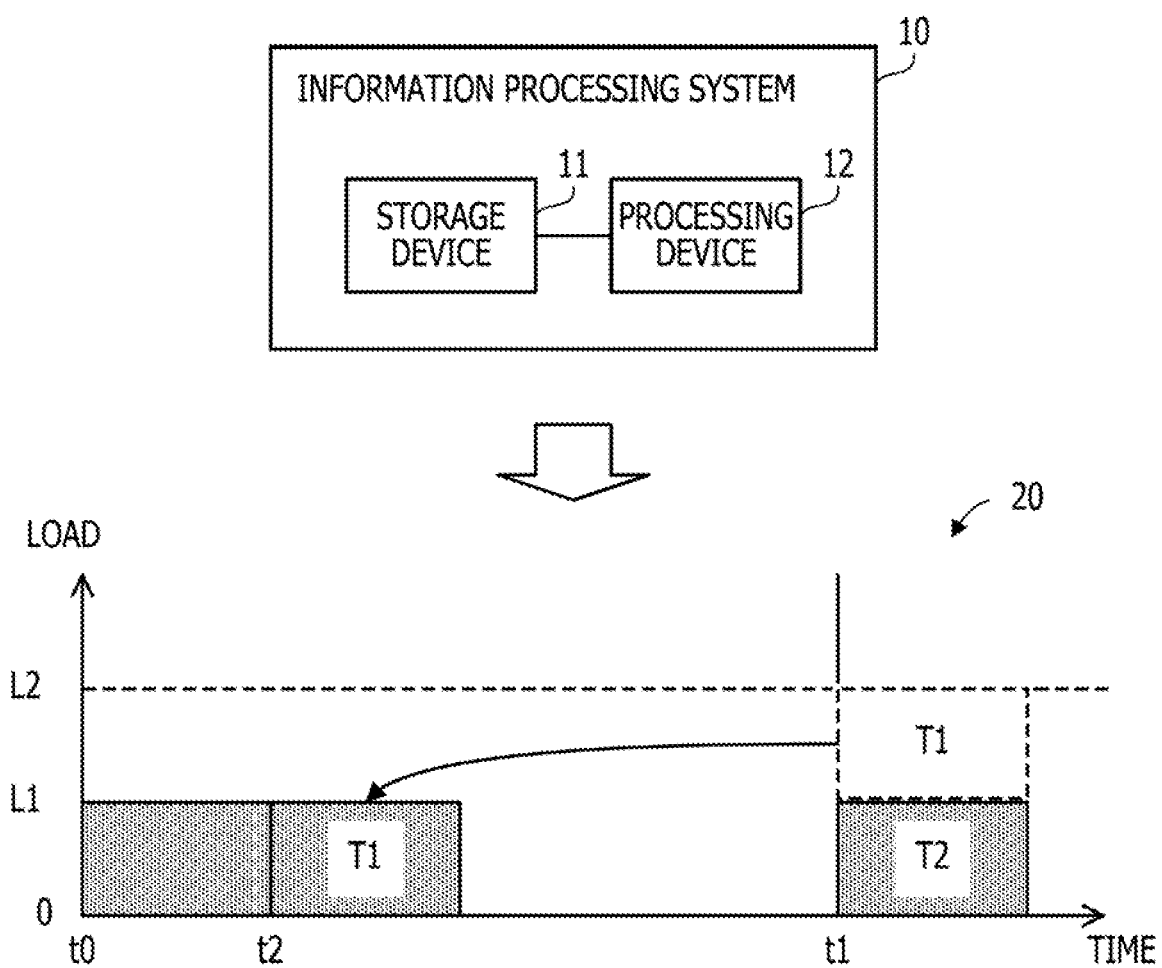
FIG. 1 illustrates an example of processing by an information processing system according to a first embodiment.

FIG. 1 illustrates an example of processing by an information processing system according to a first embodiment.

An information processing system 10 executes two or more tasks. Each task is designed to perform predetermined processing by using data accepted in a certain period. For example, a task is designed to aggregate sales data of commodities collected in one day and to output total sales of that day. Another task is designed to aggregate data on positions of presence, speeds, and the like of vehicles collected in one day and to output traffic jam conditions on that day. Note that details of tasks are not limited only to the foregoing. Each task is scheduled to be executed at specified time. For example, execution of processing to aggregate data collected in a day is scheduled at 0:00 AM on the next day.

The information processing system 10 includes a storage device 11 and a processing device 12.

The storage device 11 may be a volatile storage device such as a random-access memory (RAM) or may be a nonvolatile storage device such as a hard disk drive (HDD) and a flash memory. The processing device 12 may include a CPU, a digital signal processor (DSP), an application-specific integrated circuit (ASIC), a field-programmable gate array (FPGA), and the like. The processing device 12 may be a processor which executes a program. The "processor" referred to herein may include a set of processors (a multiprocessor).

The storage device 11 stores first clock time scheduled for execution of the task. The first clock time scheduled for execution of the task may also be regarded as time scheduled to start execution of the task. For example, the first clock time may be time scheduled to start execution of two or more tasks. The storage device 11 also stores data used in the respective tasks. The data used in the respective tasks are updated based on data received from another information processing device not illustrated in FIG. 1, for example.

The processing device 12 executes a task at second clock time earlier than the first clock time. For example, the processing device 12 starts execution of the task at the second clock time and completes execution of the task before the first clock time.

The processing device 12 does not execute the task at the first clock time when the data used in the task is not updated in a period from the second clock time to the first clock time. In other words, the processing device 12 does not start execution of the task at the first clock time when the data used in the task is not updated in the period from the second clock time to the first clock time.

The processing device 12 re-executes the task either at the first clock time or at third clock time earlier than the first clock time when the data is updated in the period from the second clock time to the first clock time. For example, the processing device 12 starts re-execution of the task either at the first clock time or at the third clock time earlier than the first clock time when the data is updated in the period from the second clock time to the first clock time.

A graph 20 is illustrated in FIG. 1. The graph 20 illustrates an example of a relation between the time and a load on the information processing system 10. The horizontal axis of the graph 20 indicates the time. The point of origin on the horizontal axis is defined as time t0. The vertical axis of the graph 20 indicates the load. The load is expressed by a usage rate of resources such as a CPU and a RAM included in the information processing system 10, for example. The point of origin on the vertical axis is defined as the load 0.

For example, the first clock time scheduled to start execution of a task T1 is set to time t1. The first clock time scheduled to start execution of a task T2 is set to the time t1. The load on the information processing system 10 associated with execution of the task T1 is set to a load L1. The load on the information processing system 10 associated with execution of the task T2 is set to the load L1. Assuming that the start of execution of both of the tasks T1 and T2 is carried out by the information processing system 10 at the time t1, the load on the information processing system 10 associated with execution of both of the tasks T1 and T2 is defined as L1+L1=L2.

At time t2 earlier than the time t1, the processing device 12 starts execution of the task T1 out of the tasks T1 and T2 that are scheduled for the start of execution at the time t1. For example, the processing device 12 determines time when the load on the information processing system 10 is lower than a threshold as the second clock time t2. For example, the processing device 12 may select one of the tasks T1 and T2 as the task to be executed at the time t2 when the selected task has a probability of updating of the data used in the relevant task in the period from the time t2 to the time t1, which is lower than a predetermined probability threshold. The processing device 12 may preferentially select one of the tasks T1 and T2 having the smaller probability mentioned above, and execute the selected task at the time t2. Information on the probability of updating of the data used in the relevant task in the period from the time t2 to the time t1 is generated in advance based on past updating statuses of the data and is stored in the storage device 11. Alternatively, the task T2 may be a task with scheduled time to start execution not changeable from the time t1 in the context of cooperation with other tasks and so forth. In this case, the processing device 12 may select the task T1 out of the tasks T1 and T2 as a target for execution at the time t2. For example, no tasks other than the task T1 are executed at the time t2. In the period from the time t2 to a point of completion of execution of the task T1, the load on the information processing system 10 caused by execution of the task T1 becomes equal to the load L1.

The processing device 12 does not start execution of the task T1 at the time t1 when the data used in the task T1 is not updated in the period from the time t2 to the time t1. In the case of the above-described example, the processing device 12 starts execution of only the task T2 at the time t1 when the data used in the task T1 is not updated in the period from the time t2 to the time t1. At the time t1, the load on the information processing system 10 caused by execution of the task T2 becomes equal to the load L1. The load L1 is smaller than the load L2. As a consequence, the load is reduced at the time t1.

On the ether hand, when the data used in the task T1 is updated in the period from the time t2 to the time t1, the processing device 12 re-executes the task T1 either at the time t1 or at a point of time after the time t2 and before the time t1. This makes it possible to obtain an appropriate result concerning the task T1 in case the data used in the task T1 is updated after execution of the task T1 ahead of the scheduled time.

According to the information processing system 10, the task is executed at the second clock time which is earlier than the first clock time scheduled for the start of execution of the task. When the data used in the task is not updated in the period from the second clock time to the first clock time, the task is not executed at the first clock time. When the data is updated in the period from the second clock time to the first clock time, the task is re-executed either at the first clock time or at the third clock time earlier than the first clock time.

As described above, the information processing system 10 is capable of decreasing concentration of tasks at prescribed time scheduled to start execution by speculatively executing part of the tasks earlier than the time scheduled to start execution, thereby reducing a peak load on the information processing system 10. Thus, concentration of the load at specified time will be successfully reduced Second Embodiment Next, a second embodiment will be described.

Figure 2:
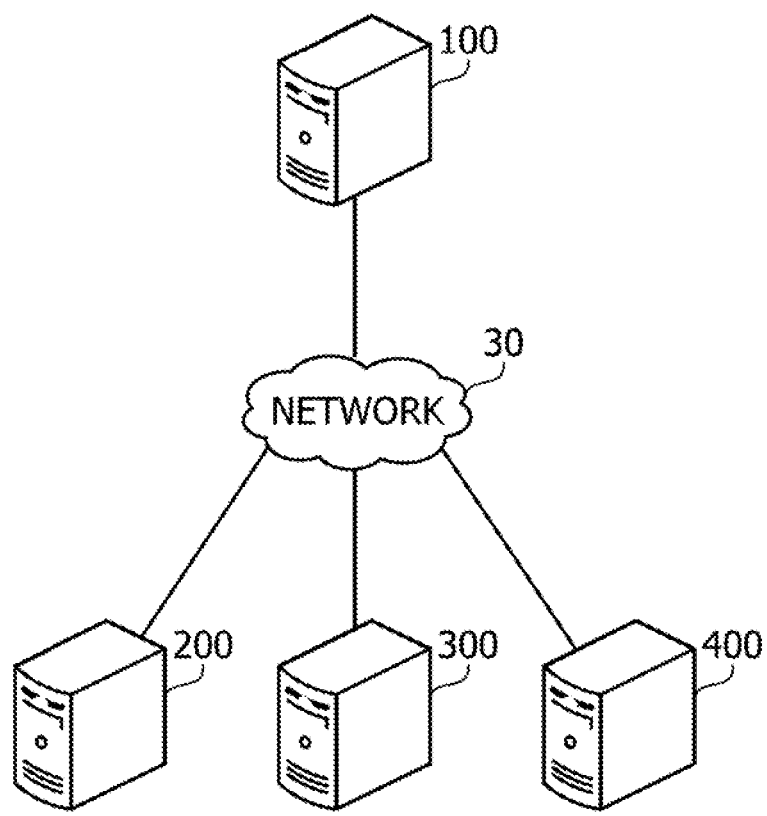
FIG. 2 illustrates an example of an information processing system according to a second embodiment.

FIG. 2 illustrates an example of an information processing system according to the second embodiment.

The information processing system according to the second embodiment includes a server 100, and edge devices 200, 300, and 400. The server 100 and the edge devices 200, 300, and 400 are coupled to a network 30. Examples of the network 30 include a local area network (LAN), a wide area network (WAN), the Internet, and the like.

Event stream processing designed to transmit data (which may be referred to as an event) from an information terminal, a sensor, or the like to a cloud and to process the transmitted event in the cloud at real time has been put into practice in recent years. In an example of this processing, a position, a speed and other data on an automobile are transmitted from the automobile to the cloud and the cloud judges dangerous driving through the stream processing.

A task designed to accumulate events and to aggregate, analyze, and report the accumulated events (such a task may be referred to as an event aggregation task) has also been put into practice in various fields. Examples of this task include a task of generating a traffic jam map and a task of specifying a location prone to a traffic accident, which are associated with accumulation of speed events from automobiles. There is also another example of such a task which is designed to collect and accumulate sales events of commodities through a point-of-sales (POS) system, to aggregate the sales for a predetermined period (such as one day), and to output an aggregate result, for example. The event aggregation tasks are not limited only to the foregoing examples and various other tasks are conceivable.

The server 100 is a server computer that executes an event aggregation task. The event aggregation task is implemented and operated as a timer service. The timer service is a service to be activated at specified time. A possible example is processing designed to aggregate speed events of automobiles accumulated on a previous day by the timer service and to update ranking of streets based on occurrence frequencies of traffic jams at 0:00 AM every day. The server 100 is an example of the information processing system 10 according to the first embodiment. The server 100 may also be referred to as an information processing device.

Each of the edge devices 200, 300, and 400 is an edge computer that transmits events to the server 100. Each of the edge devices 200, 300, and 400 may be a sensor or an edge-side server computer that collects events from terminal sensors and transmits the collected events to the server 100. For example, each of the edge devices 200, 300, and 400 may be an on-board unit that transmits the speed events of the automobile to the server 100, or a POS terminal that transmits the sales data of commodities to the server 100.

If the event aggregation task is operated as the timer service, many tasks may possibly be registered at specified time. For instance, it is easy to ensure consistency with date information by aggregating data for one day at 0:00 AM. For this reason, many tasks are prone to be scheduled intensively at that point of time.

Concentration of execution of many tasks at the specified time involves heavy consumption of system resources such as the CPU, the memory, and the network used for execution of the tasks, thus leading to an excessive peak load on the system resources. As a consequence, this concentration is more likely to encumber normal operation due to a significant delay in execution of the tasks, the system going down along with depletion of the system resources, and so forth.

Given the situation, the server 100 provides a function to suppress the concentration of the load at the specified time.

Figure 3:
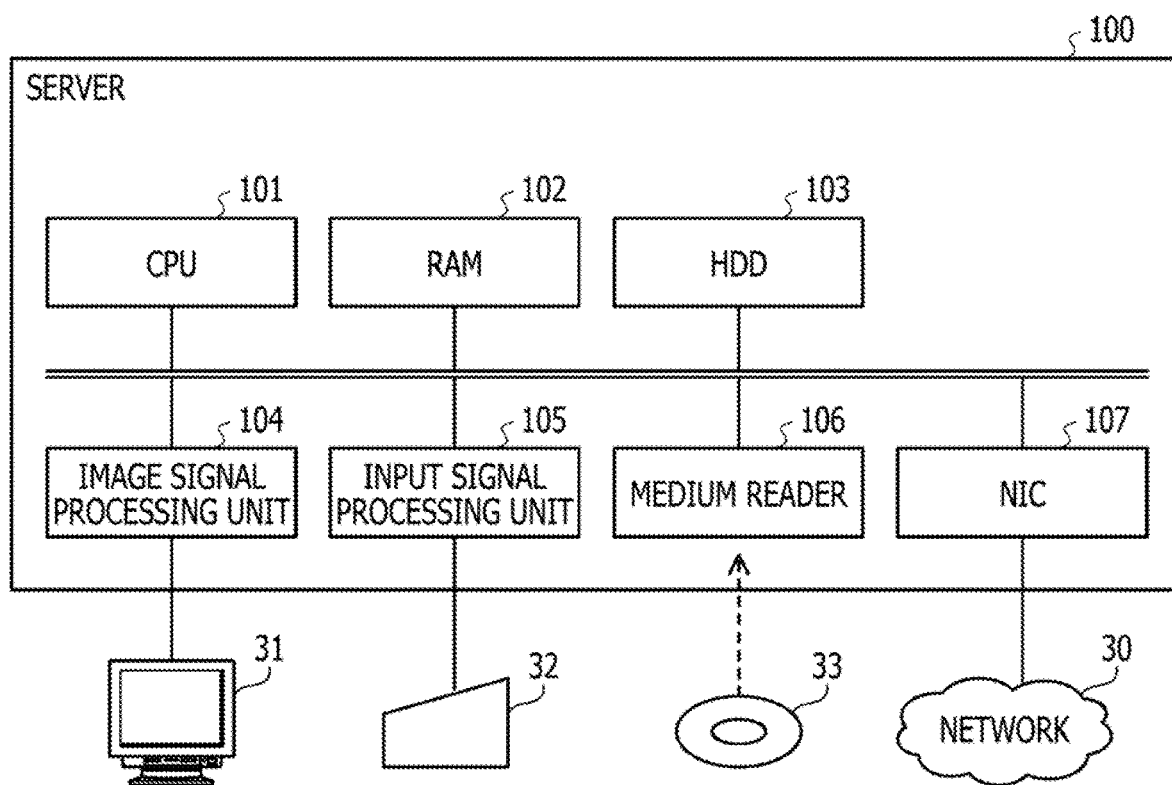
FIG. 3 is a block diagram illustrating a hardware example of a server.

FIG. 3 is a block diagram illustrating a hardware example of the server.

The server 100 includes a CPU 101, a RAM 102, an HDD 103, an image signal processing unit 104, an input signal processing unit 105, a medium reader 106, and a network interface card (NIC) 107. The CPU 101 corresponds to the processing device 12 of the first embodiment. The RAM 102 or the HDD 103 corresponds to the storage device 11 of the first embodiment.

The CPU 101 is a processor that executes program instructions. The CPU 101 loads at least part of a program or data stored in the HDD 103 into the RAM 102 and executes the program. The CPU 101 may include two or more processor cores. The server 100 may include two or more processors. The processing described below may be executed in parallel by using such processors or processor cores. A set of the processors may also be referred to as a "multiprocessor" or simply as the "processor" in some cases.

The RAM 102 is a volatile semiconductor memory that temporarily stores the program executed by the CPU 101 and data used for the operation by the CPU 101. The server 100 may include a memory of a type different from the RAM, or include two or more memories.

The HDD 103 is a non-volatile storage device that stores data as well as software programs such as an operating system (OS), middleware, and application software. The server 100 may include a storage device of a different type such as a flash memory and a solid-state drive (SSD), or include two or more non-volatile storage devices.

The image signal processing unit 104 outputs an image to a display unit 31 coupled to the server 100 in accordance with an instruction from the CPU 101. As for the display unit 31, it is possible to use a desired type of the display unit such as a cathode ray tube (CRT) display unit, a liquid crystal display (LCD) unit, a plasma display unit, and an organic electro-luminescence (OEL) display unit.

The input signal processing unit 105 acquires an input signal from an input device 32 coupled to the server 100, and outputs the input signal to the CPU 101. As for the input device 32, it is possible to use a pointing device such as a mouse, a touch panel, a touch pad, and a trackball, a keyboard, a remote controller, a button switch, and the like. Two or more input devices may be coupled to the server 100.

The medium reader 106 is a reading device that reads a program and data recorded in a recording medium 33. As for the recording medium 33, it is possible to use a magnetic disk, an optical disk, a magneto-optical (MO) disk, and a semiconductor memory, for example. Examples of the magnetic disk include a flexible disk (FD) and an HDD. Examples of the optical disk include a compact disc (CD) and a digital versatile disc (DVD).

The medium reader 106 copies the program and the data read from the recording medium 33 to a different recording medium such as the RAM 102 and the HDD 103. The read program is executed by the CPU 101, for example. The recording medium 33 may be a portable recording medium and may be used to distribute the program and the data in some cases. The recording medium 33 or the HDD 103 may be referred to as a computer-readable recording medium.

The NIC 107 is an interface coupled to the network 30 and configured to communicate with another computer through the network 30. The NIC 107 is coupled to a communication device such as a switch and a router through a cable. The NIC 107 may be coupled to the network 30 through a wireless link.

Figure 4:
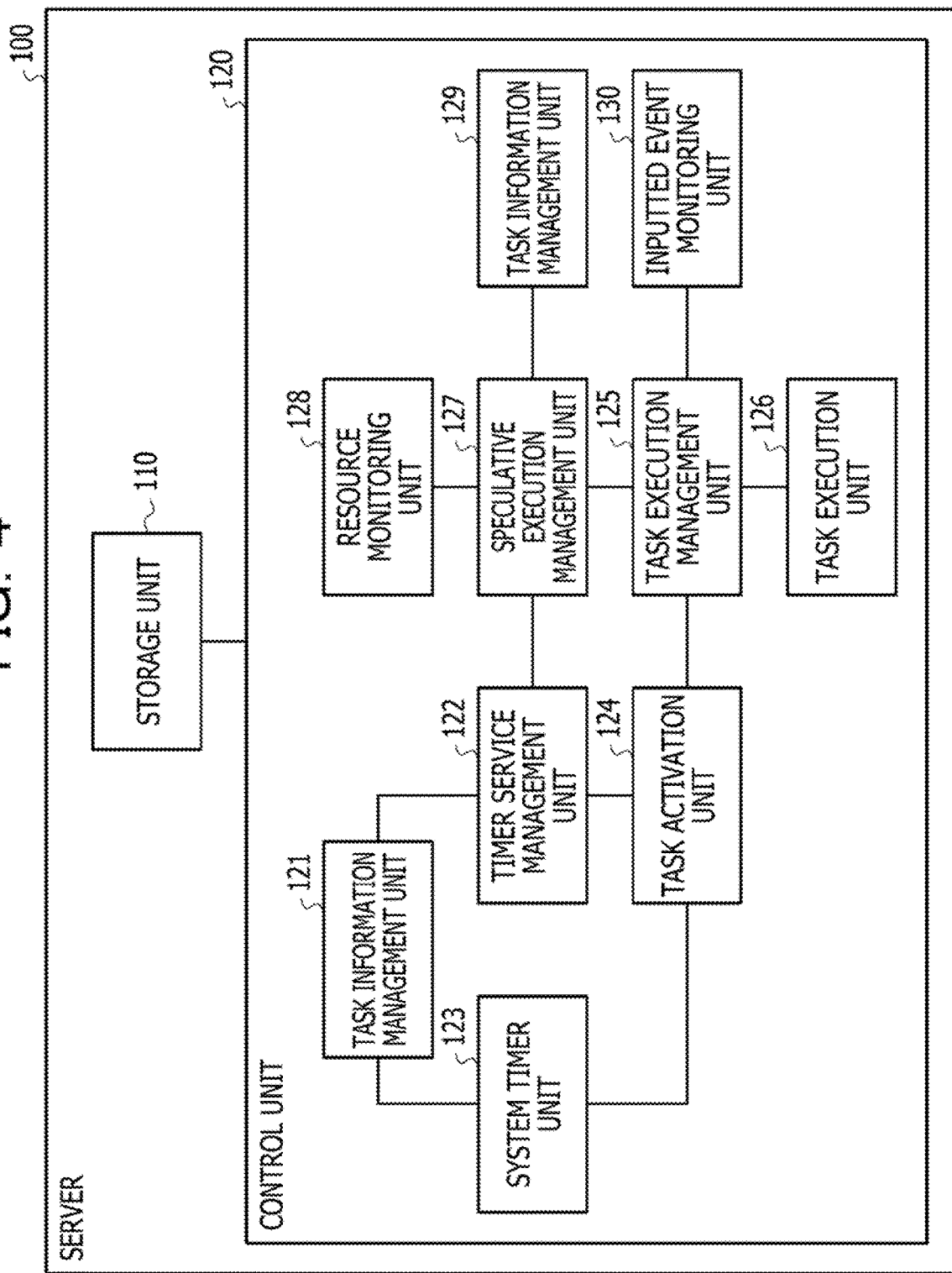
FIG. 4 illustrates a function example of the server.

FIG. 4 illustrates a function example of the server.

The server 100 includes a storage unit 110 and a control unit 120. The storage unit 110 is implemented by using a storage area of the RAM 102 or the HDD 103. The control unit 120 is implemented as a consequence of execution of the program stored in the RAM 102 by the CPU 101.

The storage unit 110 stores various data used for processing by the control unit 120. The data stored in the storage unit 110 include a timer service management table, a speculative execution candidate list, an event probability table, a tentatively finished task list, and a reference event management table.

The timer service management table includes information indicating a correspondence relation between a task activated by a timer service and start time to start execution of the task.

The speculative execution candidate list includes information on tasks applicable to speculative execution. The speculative execution means to start execution of a certain task at earlier time than its start time registered with the timer service management table.

The event probability table includes information indicating a probability of occurrence of an event to be referred to by a task in a period from certain time to time scheduled to start next execution. Here, the probability is defined for each of the tasks. The "probability of occurrence of the event to be referred to by the task in the period from the certain time to the time scheduled to start next execution" may also be defined as a "probability that data used in the task is updated in the period from the certain time to the time scheduled to start next execution". For example, the event probability table may also be defined as information indicating a value at each clock time derived from a function that defines the event probability at each clock time in a period from the previous time to execute the task to the scheduled time of next execution of the task.

The tentatively finished task list includes information on speculatively executed tasks.

The reference event management table includes information indicating a reference event for each task. The reference event management table is stored in the storage unit 110 in advance. A reference event means an event to be referred to by the task. For example, the event is identified by using identification information on the event (event identifier (ID)) included in the data received by the server 100. The event is data transmitted irregularly to the server 100, examples of which include positions and speeds of vehicles, sales of commodities at the POS, and so forth as mentioned above. However, the events are not limited only to these examples.

The control unit 120 controls execution of the tasks by the server 100. The control unit 120 includes a timer registration unit 121, a timer service management unit 122, a system timer unit 123, a task activation unit 124, a task execution management unit 125, a task execution unit 126, a speculative execution management unit 127, a resource monitoring unit 128, a task information management unit 129, and an inputted event monitoring unit 130.

The timer registration unit 121 accepts designation of the task and the start time of the task. For example, this designation may be carried out by another computer coupled to the network 30, or may be conducted by a user through manipulation of the input device 32. The timer registration unit 121 notifies the timer service management unit 122 of the accepted task and the start time thereof. The timer registration unit 121 also sets timer time to the system timer unit 123. For example, when current time is 20:00 and the start time is 0:00, the timer registration unit 121 sets for 4 hours to the system timer unit 123 as the timer time. Regarding a task subject to periodic start of its execution at specified time once a day, for instance, the task and the start time are assigned to the timer registration unit 121 at a predetermined timing once a day.

The timer service management unit 122 registers the task and the start time received from the timer registration unit 121 with a timer service management table. The timer service management unit 122 receives a task activation request from the task activation unit 124, supplies a task scheduled for the current time or time earlier than the current time as the start time to the task activation unit 124, and then deletes a record of the task from the timer service management table.

When the timer time is set, the system timer unit 123 decrements the timer time based on unit time. The unit time is set to 1 second, for example. When the timer time becomes 0, the system timer unit 123 provides the task activation request to the task activation unit 124.

Upon receipt of the task activation request from the system timer unit 123, the task activation unit 124 requests the task targeted for activation from the timer service management unit 122. After obtaining the task targeted for activation from the timer service management unit 122, the task activation unit 124 forwards the obtained task to the task execution management unit 125.

The task execution management unit 125 forwards the task received from the task activation unit 124 to the task execution unit 126. The task execution management unit 125 may receive such a task from the speculative execution management unit 127 in some cases. The task execution management unit 125 forwards the task received from the speculative execution management unit 127 to the task execution unit 126. The task execution management unit 125 registers the task received from the speculative execution management unit 127 with the tentatively finished task list. The task execution management unit 125 notifies the speculative execution management unit 127 of the task registered with the tentatively finished task list.

Upon receipt of the task from the task activation unit 124, the task execution management unit 125 regards the task as having been executed when the task has been registered with the tentatively finished task list, and deletes the task from the tentatively finished task list without forwarding the task to the task execution unit 126.

The task execution unit 126 executes the task received from the task execution management unit 125. For instance, execution of the task started earlier than the time scheduled to start execution is completed before the time scheduled to start execution thereof.

When the timer service management unit 122 registers the task with the timer service management table, the speculative execution management unit 127 adds the registered task to the speculative execution candidate list. When the timer service management unit 122 deletes the task from the timer service management table, the speculative execution management unit 127 deletes the task from the speculative execution candidate list in the case where the task is in the speculative execution candidate list The speculative execution management unit 127 receives a notice of availability of speculative execution from the resource monitoring unit 128. The speculative execution management unit 127 acquires task information on the tasks registered with the speculative execution candidate list from the task information management unit 129, and selects the task targeted for speculative execution based on the task information on the respective tasks. The speculative execution management unit 127 forwards the task to be speculatively executed to the task execution management unit 125. When the task registered with the tentatively finished task list is received from the task execution management unit 125, the speculative execution management unit 127 deletes the task from the speculative execution candidate list.

The resource monitoring unit 128 continuously monitors a status of use of system resources including a usage rate of the CPU 101 in the server 100, amounts of use of the RAM 102, the HDD 103, and other external storage devices, a used bandwidth of the network, and the like. When a system load derived from the status of use of the system resources is smaller than a preset load threshold Lr, the resource monitoring unit 128 notifies the speculative execution management unit 127 of availability of speculative execution. The system load may be the usage rate of the CPU 101, for example. Alternatively, the system load may be a value obtained by comprehensively evaluating the usage rate of the system resources of two or more types including the CPU 101, the RAM 102, the HDD 103, other external storage devices, the network bandwidth, and the like.

The task information management unit 129 provides the speculative execution management unit 127 with the task information concerning the respective tasks in the speculative execution candidate list. For example, the task information management unit 129 calculates a probability that an event referred to by the task (a reference event) occurs at least once in a period from the current time to designated start time, and registers the probability with the event probability table. The task information management unit 129 provides the probability of occurrence of the reference event to the speculative execution management unit 127, as task information.

The inputted event monitoring unit 130 accepts input of the event and obtains the task that refers to the event based on the reference event management table. The inputted event monitoring unit 130 notifies the task execution management unit 125 of the obtained task.

The task execution management unit 125 checks whether or not the task notified by the inputted event monitoring unit 130 is included in the tentatively finished task list.

When the task notified by the inputted event monitoring unit 130 is not included in the tentatively finished task list, the task is not in a tentatively finished state. Accordingly, the task execution management unit 125 terminates the processing concerning the task corresponding to the notification from the inputted event monitoring unit 130.

On the other hand, when the task notified by the inputted event monitoring unit 130 is included in the tentatively finished task list, the task execution management unit 125 confirms that the task is in the tentatively finished state and therefore initializes the task so as to enable redoing of the task. For example, the task execution management unit 125 initializes the data retained by the task back to the data at a time point of registration by the timer registration unit 121, and deletes the task from the tentatively finished task list. The task execution management unit 125 notifies the speculative execution management unit 127 of the task. The speculative execution management unit 127 adds the task to the speculative execution candidate list. As a consequence, the task is subject to redoing.

Figure 5:
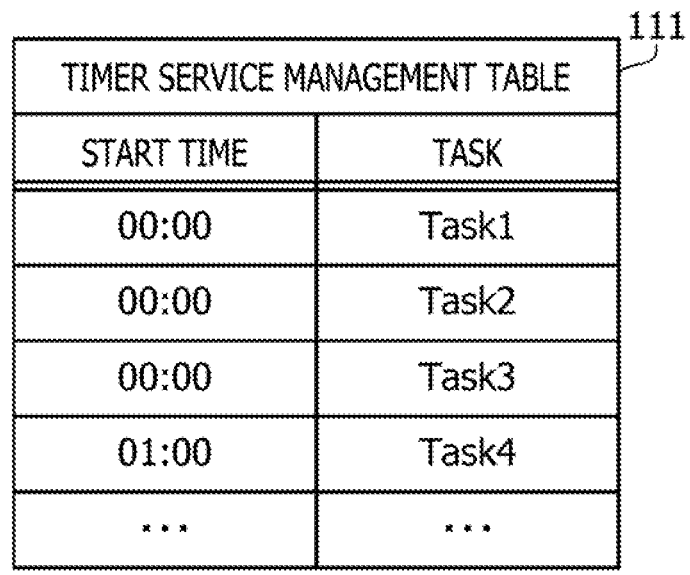
FIG. 5 illustrates an example of a timer service management table.

FIG. 5 illustrates an example of the timer service management table.

A timer service management table 111 includes items of start time and task.

The scheduled time to start execution of each task is registered on the item of start time. Identification information on the task (task ID) is registered on the item of task.

For example, a record including the start time "00:00" and the task "Task 1" is registered with the timer service management table 111. This record indicates that execution of the task "Task 1" is to be started at 0:00 every day.

The start time of other tasks is also registered with the timer service management table 111 likewise.

Figure 6:
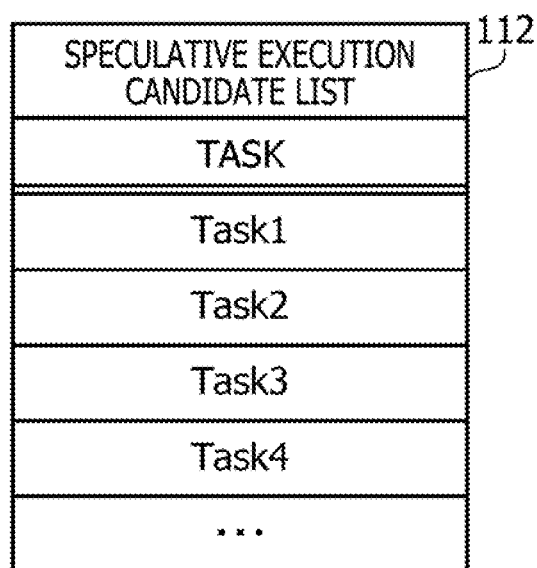
FIG. 6 illustrates an example of a speculative execution candidate list.

FIG. 6 illustrates an example of the speculative execution candidate list.

A speculative execution candidate list 112 is a list of identification information on the tasks that are speculative execution candidates.

For example, tasks "Task 1", "Task 2", and so on that represent the speculative execution candidates are registered with the speculative execution candidate list 112.

Next, a description will be given of an event probability of a certain task.

Figure 7:
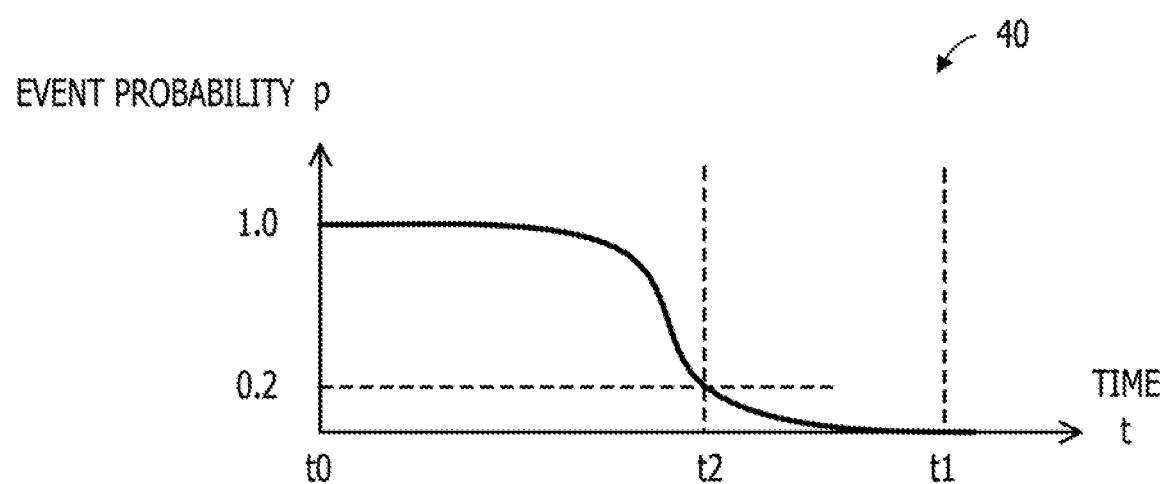
FIG. 7 illustrates an example of an event probability.

FIG. 7 illustrates an example of the event probability.

A graph 40 depicts a probability (event probability) p that an event referred to by a certain task at each clock time in a period from time t0 to time t1 of the task occurs at least once in the period from the time t0 to the time t1. The horizontal axis of the graph 40 indicates the time t and the vertical axis thereof indicates the event probability p. In FIG. 7, the time t0 is the previous time to start execution of the task. The time t1 is the time scheduled to start next execution of the task.

According to the graph 40, the event probability p takes a value close to 1 immediately after the time t0. Thereafter, the event probability p is gradually reduced and becomes closer to 0 as the time comes closer to the time t1. For example, p=0.2 holds true at the time t2. This means that the probability that the reference event of the task occurs at least once in the period from the time t2 to the time t1 is equal to 0.2.

The task information management unit 129 holds the event probability p for each task at the current time.

FIG. 8 illustrates an example of the event probability table.

An event probability table 113 includes items of task and event probability.

The identification information on the task is registered on the item of task. The event probability of the task at the current time is registered on the item of event probability.

For example, a record including the task "Task 1" and the event probability "0.8" is registered with the event probability table 113. This record indicates that the probability of occurrence of the event referred to by the task "Task 1" in the period from the current time to the time scheduled to start next execution of the task "Task 1" is equal to 0.8.

The event probabilities of other tasks are also registered with the event probability table 113 likewise. For example, the task information management unit 129 may calculate the event probability p at the current time for each task and update the event probability table 113 accordingly.

The information on the event probability illustrated in FIGS. 7 and 8 may be preset in the server 100. Alternatively, the task information management unit 129 may obtain the information from a result of the day and time of occurrence of the event in the past.

The task information management unit 129 may calculate the event probability for each task in advance on the time range basis (such as morning, daytime, evening, and midnight time ranges). In this case, the task information management unit 129 may select the applicable probability depending on the time range that covers the designated start time.

The task information management unit 129 may further calculate the event probability for each task in advance depending on a calendar attribute such as a weekday, a holiday, and the like. In this case, the task information management unit 129 may select the applicable probability depending on the calendar attribute of the corresponding day.

Figure 9:
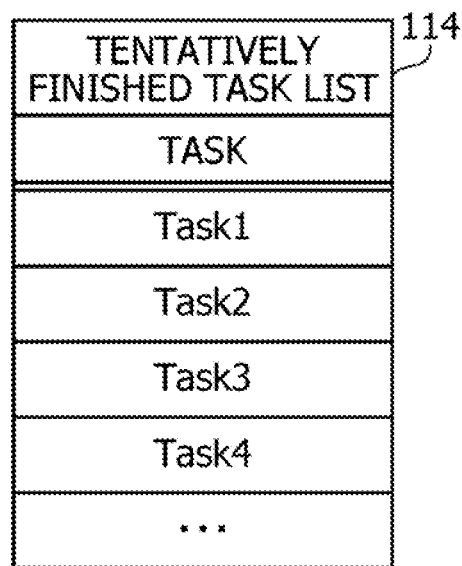
FIG. 9 illustrates an example of a tentatively finished task list.

FIG. 9 illustrates an example of the tentatively finished task list.

A tentatively finished task list 114 is a list of identification information on the speculatively executed tasks.

For example, the speculatively executed tasks "Task 1", "Task 2", and so on are registered with the tentatively finished task list 114.

FIG. 10 illustrates an example of the reference event management table.

A reference event management table 115 includes items of task and reference event.

The identification information on the task is registered on the item of task. Identification information on the event referred to by the task is registered on the item of reference event.

For example, a record including the task "Task 1" and the reference events "e1, e2, e3" is registered with the reference event management table 115. This record indicates that the identification information on the events referred to by the task "Task 1" includes e1, e2, and e3.

The reference events of other tasks are also registered with the reference event management table 115 likewise.

Next, processing procedures of the server 100 will be described.

Figure 11:
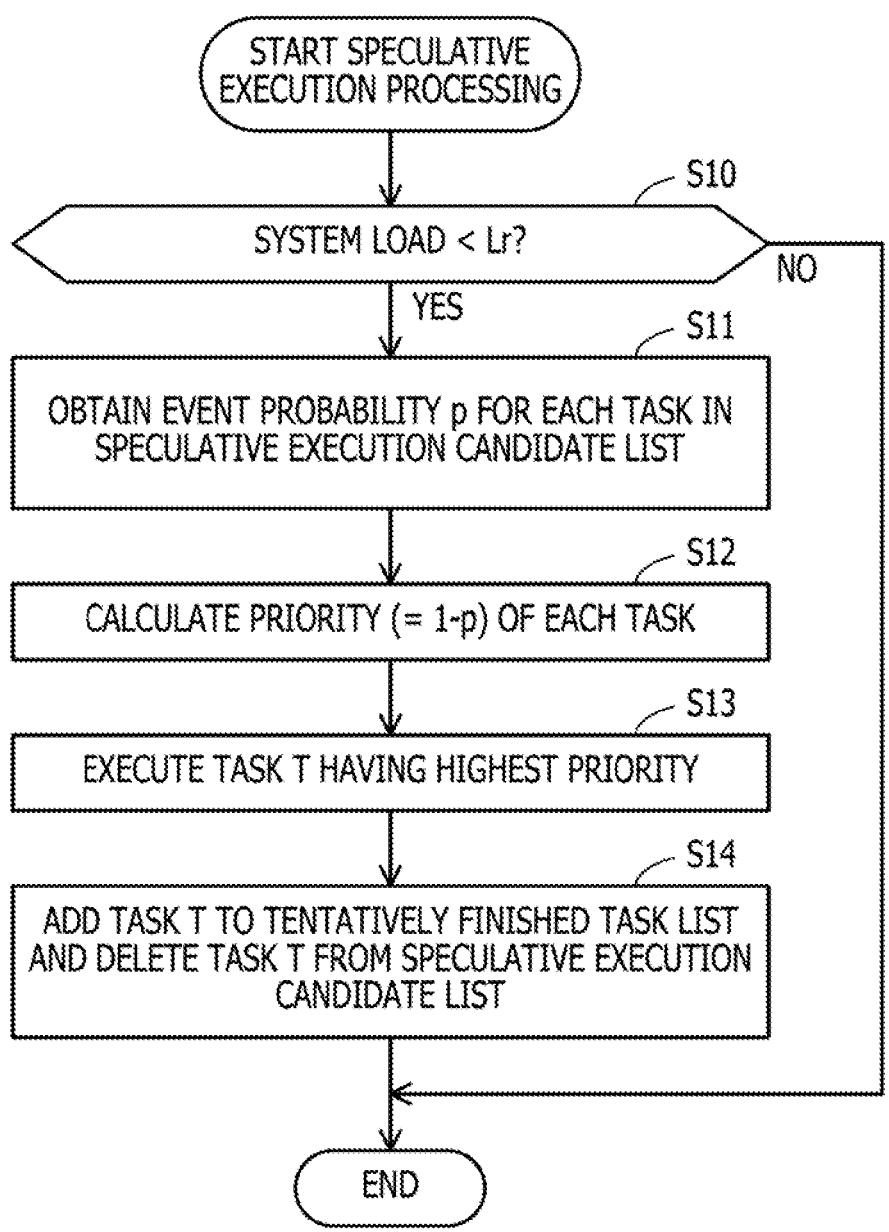
FIG. 11 is a flowchart illustrating an example of speculative execution processing.

FIG. 11 is a flowchart illustrating an example of the speculative execution processing.

(S10) The resource monitoring unit 128 determines whether or not the system load is smaller than the load threshold Lr. The processing proceeds to step S11 when the system load is smaller than the load threshold Lr. The speculative execution processing is terminated when the system load is equal to or above the load threshold Lr.

(S11) The speculative execution management unit 127 acquires the event probability p of each task in the speculative execution candidate list 112 from the task information management unit 129.

(S12) The speculative execution management unit 127 calculates priority (=1−p) of each task.

(S13) The speculative execution management unit 127 selects a task T having the highest priority as the target for speculative execution. The speculative execution management unit 127 notifies the task execution management unit 125 of the task T. The task execution management unit 125 notifies the task execution unit 126 of the task T. The task execution unit 126 executes the task T.

(S14) The task execution management unit 125 adds the task T to the tentatively finished task list 114. The task execution management unit 125 notifies the speculative execution management unit 127 of the task T. The speculative execution management unit 127 deletes the task T from the speculative execution candidate list 112. The speculative execution processing is then terminated.

The above-described speculative execution processing is repeatedly executed in a predetermined cycle, for instance.

In step S11, the speculative execution management unit 127 may determine whether or not the event probability p of each task in the speculative execution candidate list 112 is smaller than a prescribed probability threshold P. The speculative execution management unit 127 may execute the processing in step S12 and subsequent thereto while focusing on the tasks each having the event probability p smaller than the probability threshold P. Where there is no task having the event probability p smaller than the probability threshold P, the speculative execution management unit 127 may terminate the speculative execution processing. For example, the probability threshold P may be defined as P=0.5.

In step S13, the speculative execution management unit 127 may select two or more tasks as the target for speculative execution when the system load attributed to the speculative execution falls within an upper acceptance value Lc. For example, the speculative execution management unit 127 may determine the tasks targeted for speculative execution by selecting the tasks in order of priority until a sum of the system resources used in association with execution of these tasks reaches the upper acceptance value Lc.

Upon receipt of the task from the task activation unit 124 afterwards, the task execution management unit 125 regards the task as having been executed when the task has been registered with the tentatively finished task list, and deletes the task from the tentatively finished task list without forwarding the task to the task execution unit 126. Thus, execution of the speculatively executed task is omitted at the initially designated time.

Figure 12:
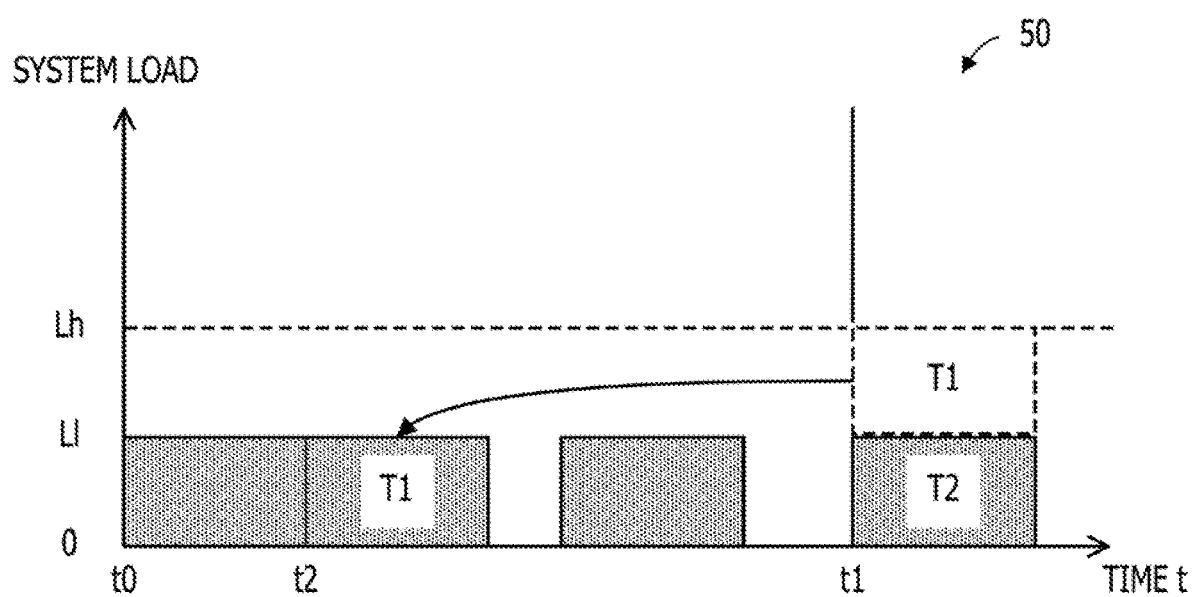
FIG. 12 illustrates an example of reduction in system load by speculative execution.

FIG. 12 illustrates an example of reduction in system load by speculative execution.

A graph 50 illustrates an example of a relation between the time and the system load. The horizontal axis of the graph 50 indicates the time t and the vertical axis thereof indicates the system load.

The time t0 is the time corresponding to the point of origin of the graph 50. The time t1 is the time scheduled to start next execution of the tasks T1 and T2. The assumption will be made that the system load falls below the load threshold Lr at the time t2 earlier than the time t1. The assumption will also be made that the priority of the task T1 is higher than the priority of the task T2 at the time t2. In this case, the server 100 starts execution of the task T1 at the time t2. As a consequence, only the task T2 out of the tasks T1 and T2 is supposed to be executed at the time t1. Accordingly, it is possible to reduce the system load at the time t1 from a system load Lh in the case of execution of the tasks T1 and T2 to a system load Ll in the case of execution of only the task T2.

Nonetheless, a result of execution of the task T1 will turn out to be incorrect if the reference event of the task T1 is received by the server 100 after execution of the task T1 at the time t2. In this case, the server 100 redoes execution of the task T1. To this end, the server 100 executes speculative execution invalidation processing described below.

Figure 13:
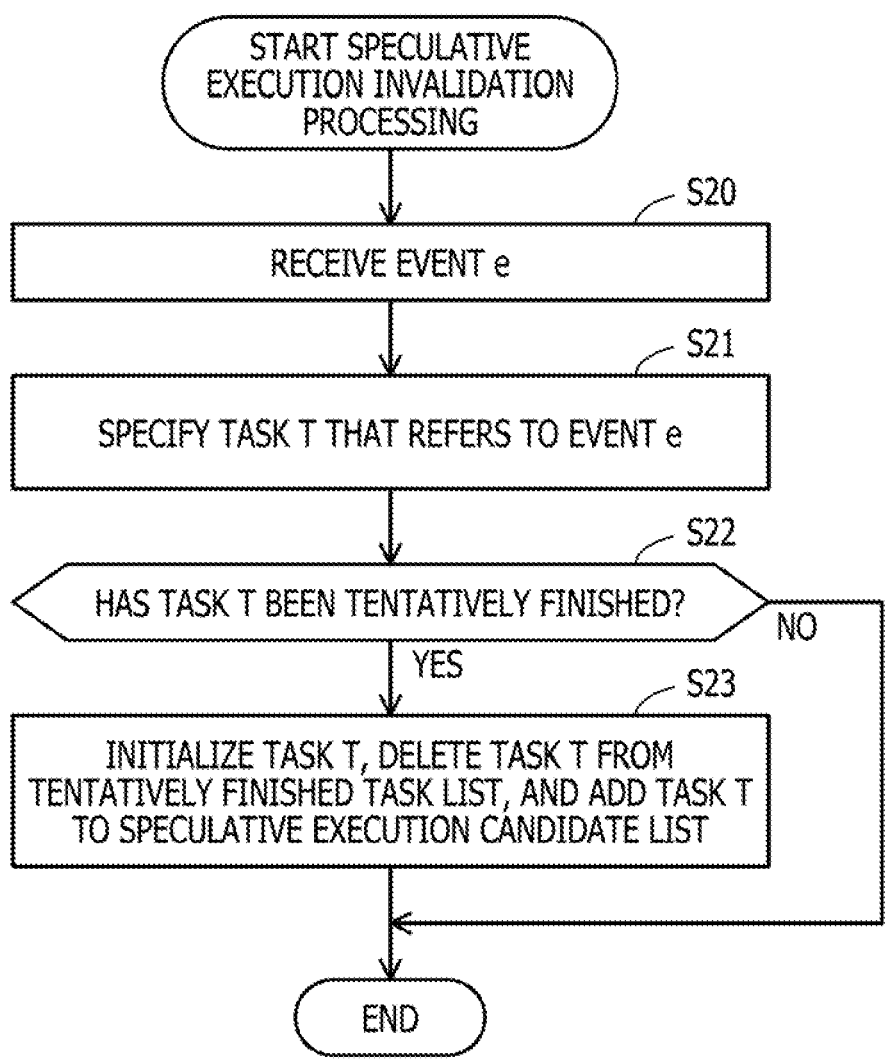
FIG. 13 illustrates an example of speculative execution invalidation processing.

FIG. 13 illustrates an example of the speculative execution invalidation processing.

(S20) The inputted event monitoring unit 130 receives an event e.

(S21) The inputted event monitoring unit 130 specifies a task T that refers to the event e based on the reference event management table 115. The inputted event monitoring unit 130 notifies the task execution management unit 125 of the specified task T.

(S22) The task execution management unit 125 determines whether or not the task T has been tentatively finished. The processing proceeds to step S23 when the task T has been tentatively finished. The speculative execution invalidation processing is terminated when the task T has not been tentatively finished. The task execution management unit 125 determines whether or not the task T has been tentatively finished depending on whether or not the task T is included in the tentatively finished task list 114. The task T has been tentatively finished when the task T is included in the tentatively finished task list 114. The task T has not been tentatively finished when the task T is not included in the tentatively finished task list 114.

(S23) The task execution management unit 125 initializes the task T and deletes the task T from the tentatively finished task list 114. In the initialization of the task T, the task execution management unit 125 initializes the data retained by the task T back to the data at the time point of registration by the timer registration unit 121. The task execution management unit 125 notifies the speculative execution management unit 127 of the task T. The speculative execution management unit 127 adds the task T to the speculative execution candidate list 112. The speculative execution invalidation processing is then terminated.

Figure 14:
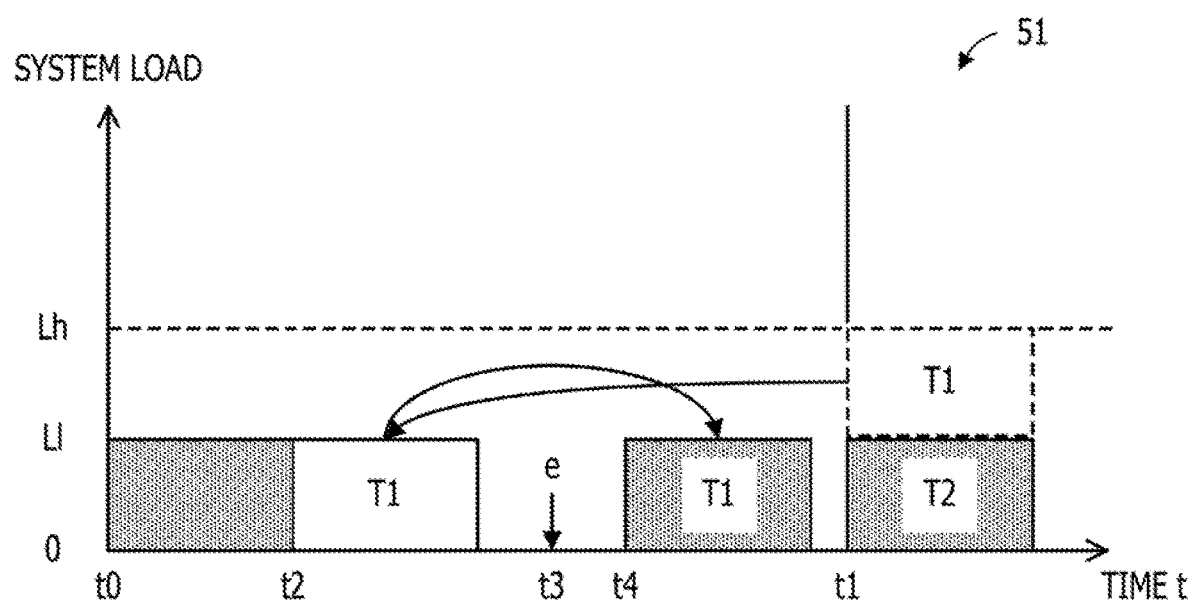
FIG. 14 illustrates an example of re-execution associated with invalidation of speculative execution.

FIG. 14 illustrates an example of re-execution associated with invalidation of speculative execution.

A graph 51 illustrates an example of a relation between the time and the system load. The horizontal axis of the graph 51 indicates the time t and the vertical axis thereof indicates the system load.

The time t0 is the time corresponding to the point of origin of the graph 51. The time t1 is the time scheduled to start next execution of the tasks T1 and T2. The assumption will be made that the system load falls below the load threshold Lr at the time t2 earlier than the time t1. The assumption will also be made that the priority of the task T1 is higher than the priority of the task T2 at the time t2. In this case, the server 100 starts execution of the task T1 at the time t2. The execution of the task T1 is completed at the time earlier than the time t1.

Time t3 is time later than the time t2 and earlier than the time t1. The server 100 receives the event e at the time t3. The event e is the reference event of the task T1. The server 100 initializes the task T1 and deletes the task T1 from the tentatively finished task list 114. At the same time, the server 100 designates the task T1 as the speculative execution candidate again by adding the task T1 to the speculative execution candidate list 112.

The assumption will be made that the system load falls below the load threshold Lr at time t4 thereafter. The time t4 is the time earlier than the time t1. The assumption will be made that the priority of the task T1 is higher than the priority of the task T2 at the time t4. In this case, the server 100 starts execution of the task T1 at the time t4.

As described above, even when the reference event of the task T1 occurs after the task T1 is speculatively executed and the result of speculative execution therefore becomes incorrect, it is still possible to obtain a correct result of execution as the server 100 re-executes the task T1. As illustrated in FIG. 14, it is also possible to reduce the chance of concentration of the load at the time t1 by enabling re-execution of the task T1 at the time t4 earlier than the time t1 being the originally scheduled time to start execution. Note that the task T1 may not be re-executed at the time t4. In this case, execution of the task T1 may be started at the originally scheduled time t1.

As described above, it is possible to suppress the concentration of the load at the specified time by using the server 100.

On the other hand, another possible option for reducing the load associated with execution of two or more tasks is to conduct scheduling while delaying the time to execute part of the tasks so as not to cause overlap of execution of the tasks in a certain time range. However, it is not possible to delay execution of the task so as to sufficiently reduce the peak load on the system there is only a short time allowance far the delay of execution of the task.

For example, there may be a task that cooperates with an event aggregation task. In this case, a delay in execution of the event aggregation task leads to a delay in execution of all the subsequent tasks. Accordingly, it is desirable to reduce permissible time for the delay in execution of the event aggregation task. In recent years, there have been many cases of adopting a method (microservice architecture) of constructing one service by coordinating two or more tasks, and the permissible time for the delay in execution has been in a decreasing trend. Hence, this trend makes it difficult to sufficiently reduce the peak load by delaying the time to execute the tasks.

On the other hand, according to the server 100, execution of part of the tasks is accelerated even when the execution of two or more tasks is scheduled at the specified time. In this way, it is possible to reduce the peak load on the system and level out the system load at various time points even if the permissible time for the delay in execution of the tasks is not sufficient.

As described with reference to FIGS. 7 and 8, the task information management unit 129 may determine a probability that the data used in the task is updated in the period from the time to carry out speculative execution to the designated time, based on an attribute of the time range to which the time to carry out speculative execution belongs. Possible examples of the time range to which the relevant time belongs include 6 to 10 o'clock, 10 to 17 o'clock, 17 to 0 o'clock, and 0 to 6 o'clock. Possible examples of the attribute of the time ranges include morning, daytime, evening, and midnight. Another possible example of the time range to which the relevant time belongs is a calendar date (such as Aug. 15, 2019). Possible examples of the attribute of this time range include a distinction between a weekday and a holiday, the day of the week (such as Thursday), and the like. In this case, information indicating an event updating probability corresponding to the time range attribute relative to the task is stored in the storage unit 110 in advance. Based on this information, the task information management unit 129 is capable of obtaining the event updating probability concerning the task corresponding to the attribute of the time range to which the current time belongs.

By appropriately selecting the applicable event probability as described above, it is possible to accurately select the task that is less likely to be subject to redoing speculative execution, and thus to level out the system load even when there are many speculative execution candidates.

There may also be a case where the reference event is periodic and the last event before the time scheduled to start the task is already known. In this case, the speculative execution management unit 127 may increase the priority of the task that adopts the last event as the reference event to the maximum in step S12 of FIG. 11 as long as it is after the last event. After the last event, there is no chance of redoing speculative execution. Accordingly, it is possible to reliably reduce the peak load on the system at the designated time.

While the information processing system according to the second embodiment has described the example in which the server 100 executes the tasks. Instead, the server 100 may control the schedule of task execution by a different server. In this case, the server 100 is capable of leveling out the load on the different server at each clock time while suppressing the load concentration in the different server at the specified time by means of control execution of the task in the different server in accordance with a method similar to the above-described method.

Third Embodiment

Next, a third embodiment will be described. Items different from the above-described second embodiment will be mainly discussed below while omitting explanations of the common items.

Configurations of the information processing system and the server 100 of the third embodiment are the same as the configurations of the information processing system and the server 100 of the second embodiment described with reference to FIGS. 2 to 4, and explanations thereof will be omitted.

When the task is speculatively executed in step S13 of FIG. 11, the processing may fail to maintain consistency outside the task if the task performs processing to transmit the result of execution to another task, to record the result of execution in a database or a time series log, or the like before the designated time.

In this regard, when the task is speculatively executed, the server 100 may suspend execution of the task immediately before the processing that involves the outside of the task such as transmission or recording of the result of execution, and may resume the task immediately after the suspension at the designated time.

FIG. 15 (i.e., FIGS. 15A, 15B, and 15C) illustrates an example of task suspension/resumption according to a third embodiment.

FIG. 15A illustrates an example of the entirety of an operation flow of a certain task. The task includes steps S1, S2, and S3.

Step S1 is a step of collecting accumulated reference events. A step that belongs to the task may also be referred to as a sub-task. A function corresponding to step S1 in the task will be referred to as "part A". The "function" may also be any of a method, a sub-routine, and the like.

Step S2 is a step of calculation by using the events collected in step S1. A function corresponding to step S2 in the task will be referred to as "part B".

Step S3 is a step of transmitting a result of calculation in step S2 to another task or recording the result of calculation in step S2 in the database or the time series log. A function corresponding to step S3 in the task will be referred to as "part C". Note that there may be two or more functions "part C".

FIG. 15B illustrates an example of executing suspension of the task illustrated in FIG. 15A. For instance, when the server 100 speculatively executes the task, the server 100 suspends execution of the task immediately after the part B (step S2). When re-executing the suspended task before the designated time, the server 100 re-executes the task from step S1.

FIG. 15C illustrates an example of executing resumption of the task illustrated in FIG. 15A. For instance, when it is the designated time without occurrence of any reference events involving the task, the server 100 resumes the task from the part C (step S3).

Concerning a portion of the task targeted for speculative execution which is supposed to be executed after the designated time, the server 100 may suspend immediately before this portion while identifying any of communication with another task and access to the database or the like by a program module of the task. In this case, the task execution management unit 125 may add the state of the task to the tentatively finished task list.

Figure 16:
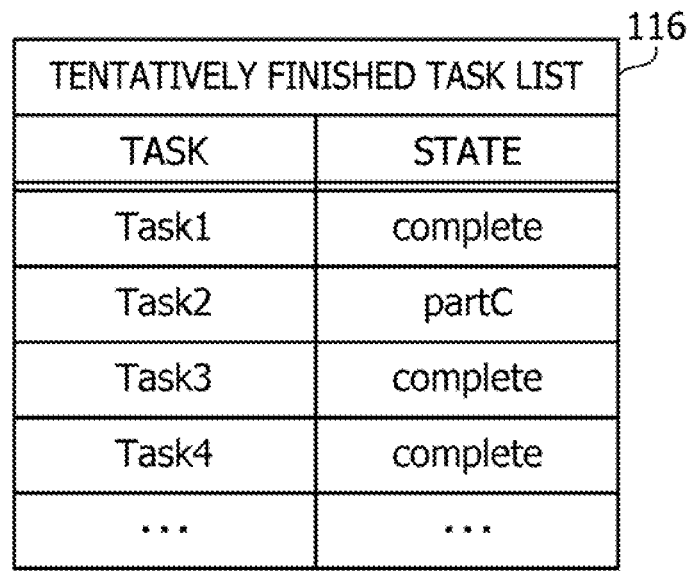
FIG. 16 illustrates an example of the tentatively finished task list.

FIG. 16 illustrates an example of the tentatively finished task list.

A tentatively finished task list 116 is stored in the storage unit 110 instead of the tentatively finished task list 114. The tentatively finished task list 116 includes items of task and state. The identification information on the task is registered on the item of task. The state of the speculatively executed task is registered on the item of state. A term "complete" is registered on the item of state when the entire task is tentatively finished. When the task is suspended, the name (such as "part C") of the portion (the function or the sub-routine) to be resumed is registered on the item of state.

For example, a record including the task "Task 1" and the state "complete" is registered with the tentatively finished task list 116. This record indicates that the entire task "Task 1" is in the tentatively finished state.

A record including the task "Task 2" and the state "part C" is also registered with the tentatively finished task list 116. This record indicates that the task "Task 2" is suspended immediately before the "part C" and is supposed to be resumed from the "part C" at the designated time.

The states of other tasks are also registered with the tentatively finished task list 116 likewise.

For example, when it is the designated time for the task "Task 2" in the timer service management table 111, the task activation unit 124 notifies the task execution management unit 125 of activation of the task "Task 2". The task execution management unit 125 notifies the task execution unit 126 of execution of the task "Task 2" from the part C based on the tentatively finished task list 116. In response to the notification, the task execution unit 126 starts execution of the task "Task 2" from the part C. On the other hand, the task execution management unit 125 regards the task in the "complete" state such as the task "Task 1" in the tentatively finished task list 116 as having been executed, and does not notify the task execution unit 126 of this task.

In this way, it is possible to conduct speculative execution while maintaining consistency even when the task includes the portion of the processing supposed to be executed after the designated time. It is possible to execute a portion of the processing immediately preceding the portion of the processing supposed to be executed after the designated time in advance of the designated time, and thus to reduce the peak load on the system at the designated time

Fourth Embodiment

Next, a fourth embodiment will be described. Items different from the above-described second and third embodiments will be mainly discussed below while omitting the explanations of the common items.

Configurations of the information processing system and the server 100 of the fourth embodiment are the same as the configurations of the information processing system and the server 100 of the second embodiment described with reference to FIGS. 2 to 4, and explanations thereof will be omitted.

In step S12 of FIG. 11, the speculative execution management unit 127 may obtain the priority of each task by using an amount of system resources used by the task in addition to the probability of occurrence of the reference event.

An amount L of system resources used is expressed by the following formula (1), for example.

$$L=f(cpu+mem+storage+net)dt \qquad (1)$$

Code cpu denotes the usage rate of the CPU 101 associated with execution of the task. Code mem denotes a ratio of a used size of the RAM 102 associated with execution of the task to a total size of the RAM 102. Code storage denotes a ratio of a used size of the HDD 103 associated with execution of the task to a total size of the HDD 103. Code net denotes a ratio of a used bandwidth of the NIC 107 associated with execution of the task to a total communication bandwidth of the NIC 107.

For example, each of the codes cpu, mem, storage, and net is provided as a function of the time (such as a function of period of day). The amount L of system resources used may be obtained as an amount of system resources used per unit time (such as one second) at the corresponding time, for example.

In the formula (1), each of the usage rate of the CPU, the usage rate of the memory, the usage rate of the storage, and the usage rate of the communication bandwidth may be multiplied by a weight coefficient. For example, the amount L of system resources used may be expressed by a weighted sum of two or more types of resources including the usage rate of the CPU, the usage rate of the memory, the usage rate of the storage, the usage rate of the communication bandwidth, and so forth.

The task information management unit 129 may possibly measure and obtain the amount L of system resources used by each task every time the task is executed. In this case, the task information managed by the task information management unit 129 may be formed from a non-event probability and the amount L of system resources used as described below.

FIG. 17 illustrates an example of a parameter table according to the fourth embodiment.

A parameter table 117 is generated by the task information management unit 129 for each clock time and stored in the storage unit 110. The parameter table 117 includes items of task, value q, and value L. The identification information on the task is registered on the item of task. A probability of non-occurrence of the reference event (which may be referred to as the non-event probability as appropriate) in the period from the current time to the designated time is registered on the item of value q. The amount of system resources used by the task is registered on the item of value L.

For example, a record including the task "Task 1", the value q "0.8", and the value L "0.5" is registered with the parameter table 117. This record indicates that the probability q of non-occurrence of the reference event of the task "Task 1" in the period from the current time to the designated time concerning the task "Task 1" is equal to 0.8 and that the amount L of system resources used by this task is equal to 0.5.

The values q and L of other tasks are also registered with the parameter table 117 likewise.

The task information management unit 129 is capable of obtaining the probability q of non-occurrence of the reference event by calculating q=1−the event probability p.

The speculative execution management unit 127 may obtain the priority of each task by using a function f(q, L) of the non-event probability q and the amount L of system resources used. The function f(q, L) is expressed by the following formula (2), for example.

$$f(q, L)=(q-q0)\times L+q0\times Lu \qquad (2)$$

Code q0 denotes a constant parameter. The value q0 is equal to 0.5, for example. Code Lu denotes another constant parameter. The value Lu is equal to 4.0 for example.

Figure 18:
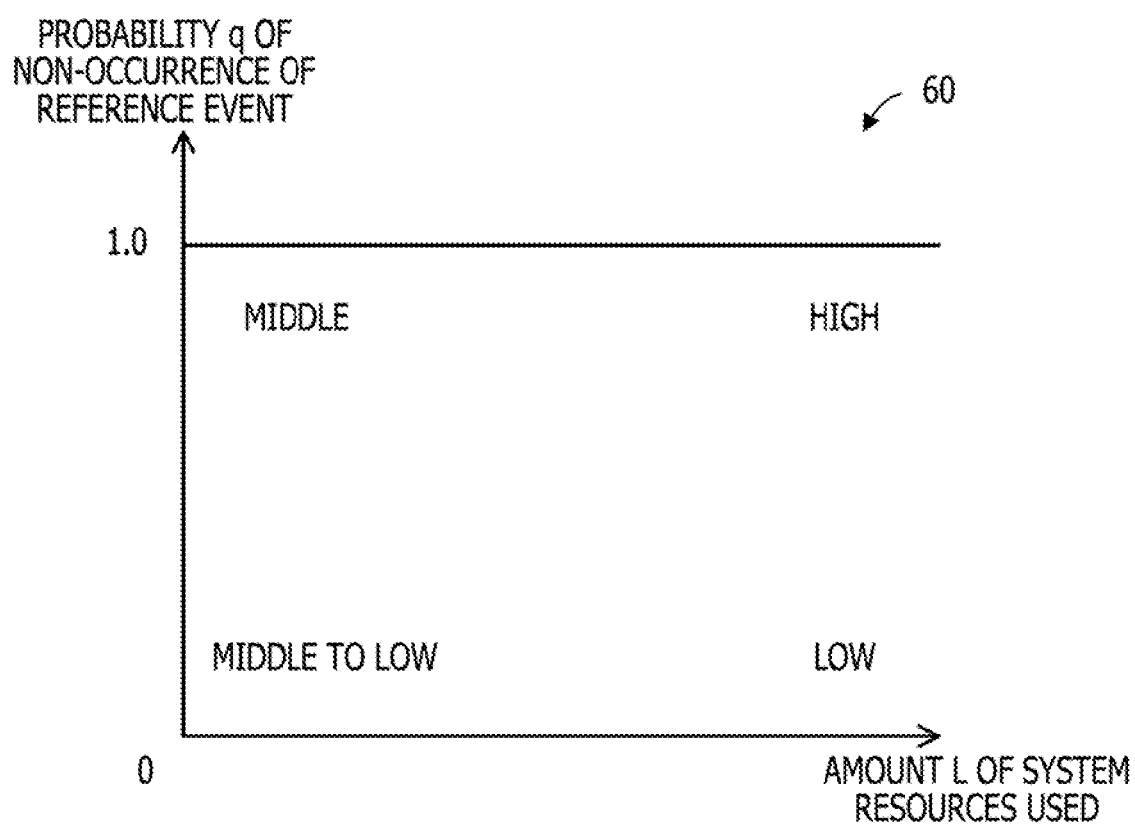
FIG. 18 illustrates an example of a tendency of priority.

FIG. 18 illustrates an example of a tendency of priority.

A graph 60 illustrates an example of a tendency of values of priority obtained by the formula (2). As illustrated in the graph 60, the speculative execution management unit 127 increases priority of a task having a larger amount L of the system resources used when the non-event probability q is higher than the reference value q0, and increases priority of a task having a smaller amount L when the value q is lower than the reference value q0. The priority in the case where the non-event probability q is higher than the reference value q0 tends to be higher than the priority in the case where the value q is lower than the reference value q0.

For example, when the value q0 is equal to 0.5 and the value Lu is equal to 4.0 in the parameter table 117 of FIG. 17, the priority of each task is calculated as follows.

The priority of the task "Task 1" is calculated as (0.8−0.5)*0.5+0.5*4.0=2.15.

The priority of the task "Task 2" is calculated as (0.8−0.5)*0.2+0.5*4.0=2.06.

The priority of the task "Task 3" is calculated as (0.2−0.5)*0.2+0.5*4.0=1.94.

The priority of the task "Task 4" is calculated as (0.2−0.5)*0.5+0.5*4.0=1.85.

In this case, the task "Task 1" has the highest priority. Accordingly, the speculative execution management unit 127 selects the task "Task 1" as the task targeted for speculative execution.

Next, procedures of speculative execution processing by the server 100 according to the fourth embodiment will be described.

Figure 19:
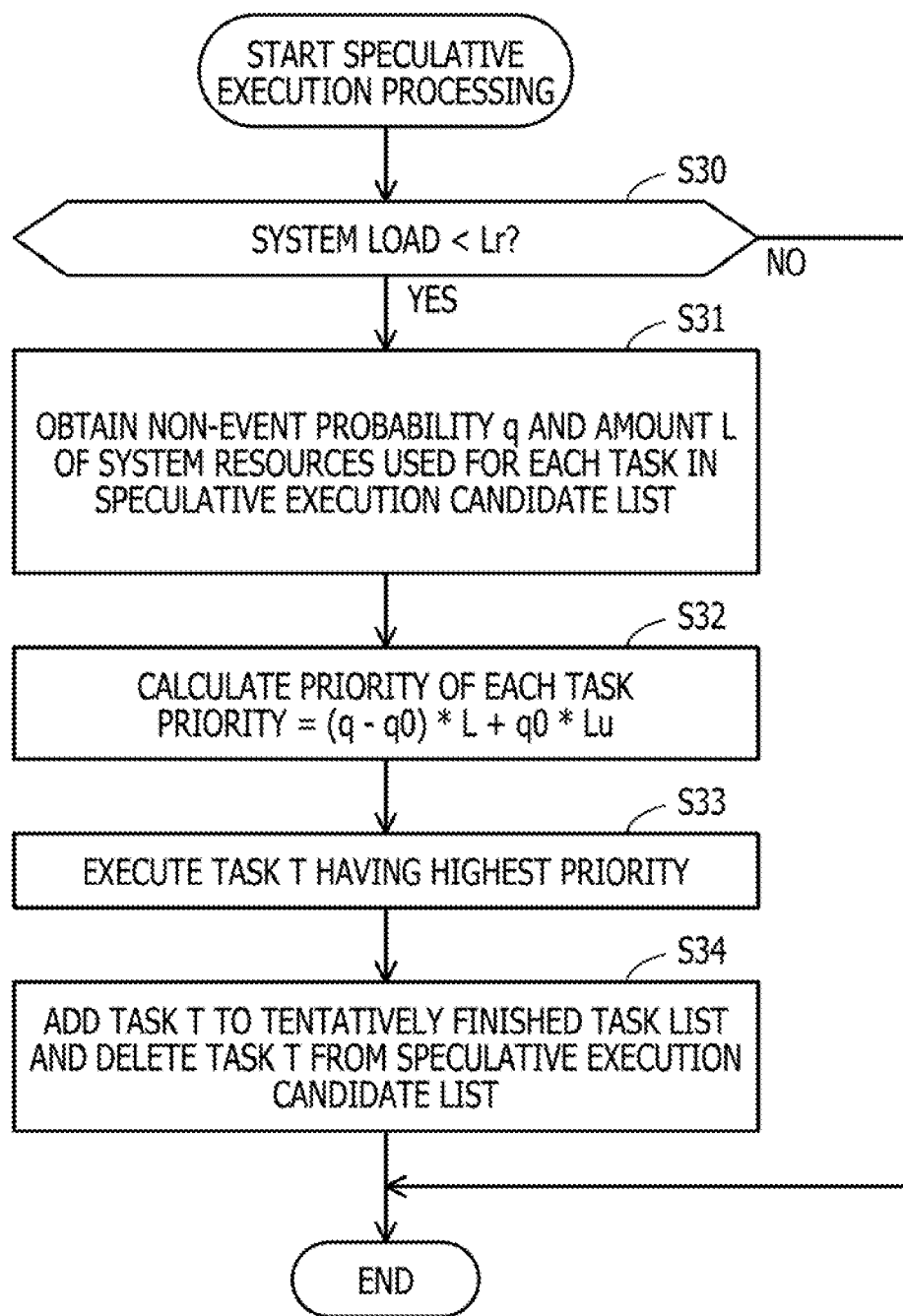
FIG. 19 is a flowchart illustrating an example of the speculative execution processing.

FIG. 19 is a flowchart illustrating an example of the speculative execution processing.

(S30) The resource monitoring unit 128 determines whether or not the system load is smaller than the load threshold Lr. The processing proceeds to step S31 when the system load is smaller than the load threshold Lr. The speculative execution processing is terminated when the system load is equal to or above the load threshold Lr.

(S31) The speculative execution management unit 127 acquires the non-event probability q (=1−p) of and the amount L of system resources used by each task in the speculative execution candidate list 112 from the task information management unit 129.

(S32) The speculative execution management unit 127 calculates the priority of each task by using the formula (2).

(S33) The speculative execution management unit 127 selects the task T having the highest priority as the target for speculative execution. The speculative execution management unit 127 notifies the task execution management unit 125 of the task T. The task execution management unit 125 notifies the task execution unit 126 of the task T. The task execution unit 126 executes the task T.

(S34) The task execution management unit 125 adds the task T to the tentatively finished task list 114. The task execution management unit 125 notifies the speculative execution management unit 127 of the task T. The speculative execution management unit 127 deletes the task T from the speculative execution candidate list 112. The speculative execution processing is then terminated.

As described above, the speculative execution management unit 127 calculates the priority of each of the tasks by using the probability that the data used in the task is updated in the period from the current time to the designated time and the amount of resources used by execution of the task. The speculative execution management unit 127 determines the task to be executed at the current time based on the priority of each of the tasks.

For example, the speculative execution management unit 127 selects the task that has a low event probability and a large amount of system resources used preferentially as the target for speculative execution. This makes it possible to significantly reduce the peak load on the system at the designated time, and moreover, to reduce costs associated with redoing the speculative execution.

The speculative execution management unit 127 may specify a set of tasks among the tasks scheduled to start execution at the designated time such that a sum of the amounts of resources used by execution of the set of tasks becomes smaller than a predetermined permissible amount, and may determine execution of the specified set of tasks at the current time.

For example, in step S33, the speculative execution management unit 127 may select two or more tasks as the target for speculative execution when the system load attributed to the speculative execution falls within the upper acceptance value Lc. For instance, the speculative execution management unit 127 obtains an evaluation value Ex_i regarding the task i by using the following formula (3).

$$Ex\_i = (1 - p\_i) \times L\_i \quad (3)$$

Code p_i denotes the event probability of the task i. Code L_i denotes the amount of system resources used by the task i.

The speculative execution management unit 127 obtains a combination of the tasks, which involves the sum of the values Ex_i of the tasks being equal to or below the permissible amount Lc of the system load associated with the speculative execution, as the tasks to be speculatively executed. The method of selecting two or more tasks targeted for speculative execution based on the values Ex_i according to the formula (3) and the value Lc may also be used in step S13 of FIG. 11.

Figure 20:
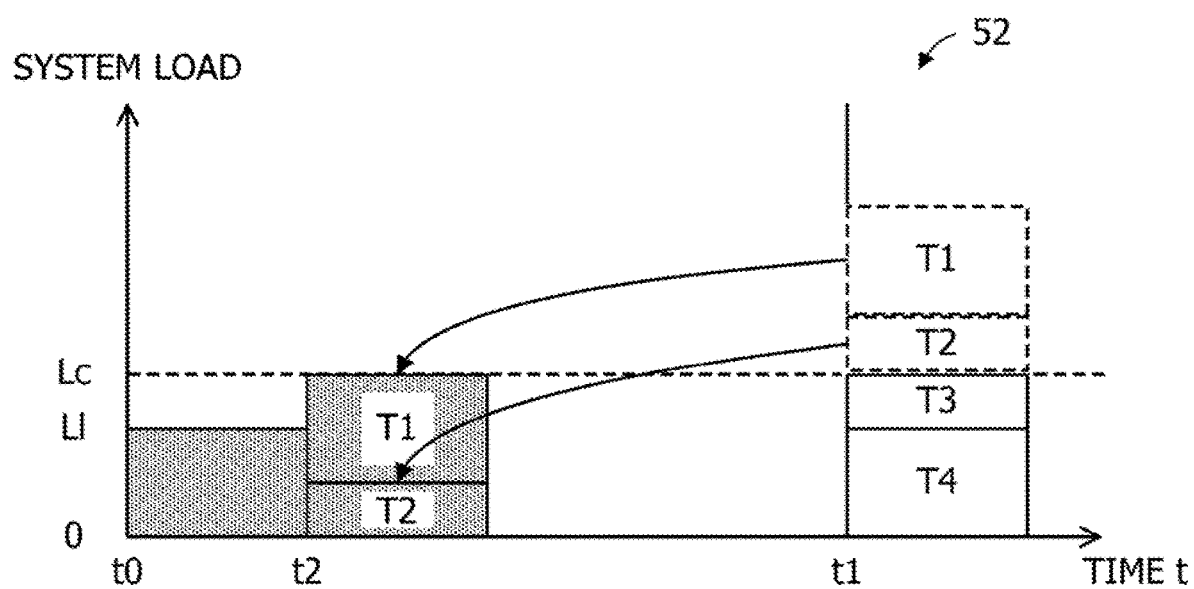
FIG. 20 illustrates an example of the reduction in system load by speculative execution.

FIG. 20 illustrates an example of the reduction in system load by speculative execution.

A graph 52 illustrates an example of a relation between the time and the system load. The horizontal axis of the graph 52 indicates the time t and the vertical axis thereof indicates the system load.

The time t0 is the time corresponding to the point of origin of the graph 52. The time t1 is the time scheduled to start next execution of the tasks T1, T2, T3, and T4. The assumption will be made that the system load falls below the load threshold Lr at the time t2 earlier than the time t1.

At the time t2, the values Ex_i of the respective tasks are assumed to take the following values, for example.

The evaluation value Ex_1 of the task T1 is calculated as $(1-0.8)*0.5=0.10$.

The evaluation value Ex_2 of the task T2 is calculated as $(1-0.8)*0.2=0.04$.

The evaluation value Ex_3 of the task T3 is calculated as $(1-0.2)*0.2=0.16$.

The evaluation value Ex_4 of the task T4 is calculated as $(1-0.2)*0.5=0.40$.

An inequality Ex_1+Ex_2<Lc holds true when the permissible amount Lc of the system load is equal to 0.15, and the speculative execution management unit 127 therefore selects the set of the tasks T1 and T2 as the target for speculative execution. The tasks T1 and T2 are then executed at the time t2.

At the time t1, only the tasks T3 and T4 out of the tasks T1, T2, T3, and T4 are supposed to be executed. Accordingly, it is possible to reduce the system load at the time t1 as compared to the system load in the case of execution of the tasks T1, T2, T3, and T4.

As described above, when it is possible to combine two or more tasks in carrying out speculative execution, the speculative execution management unit 127 selects the combination of the tasks having the largest sum of the values Ex_i. This makes it possible to reduce the peak load on the system more at the designated time and thus to level out the system load more appropriately.

Fifth Embodiment

Next, a fifth embodiment will be described. Items different from the above-described second to fourth embodiments will be mainly discussed below while omitting the explanations of the common items.

Configurations of the information processing system and the server 100 of the fifth embodiment are the same as the configurations of the information processing system and the server 100 of the second embodiment described with reference to FIGS. 2 to 4, and explanations thereof will be omitted.

When speculatively executing the task in step S13 of FIG. 11 or in step S33 of FIG. 19, the task execution management unit 125 may execute the task after arranging insertion of suspension/resumption processing to the task before the execution of the task. In this case, the task is suspended in mid-course at the time of speculative execution. The task is resumed from the suspended portion in the case of re-execution after the invalidation or in the case of execution at the designated time.

Figure 21:
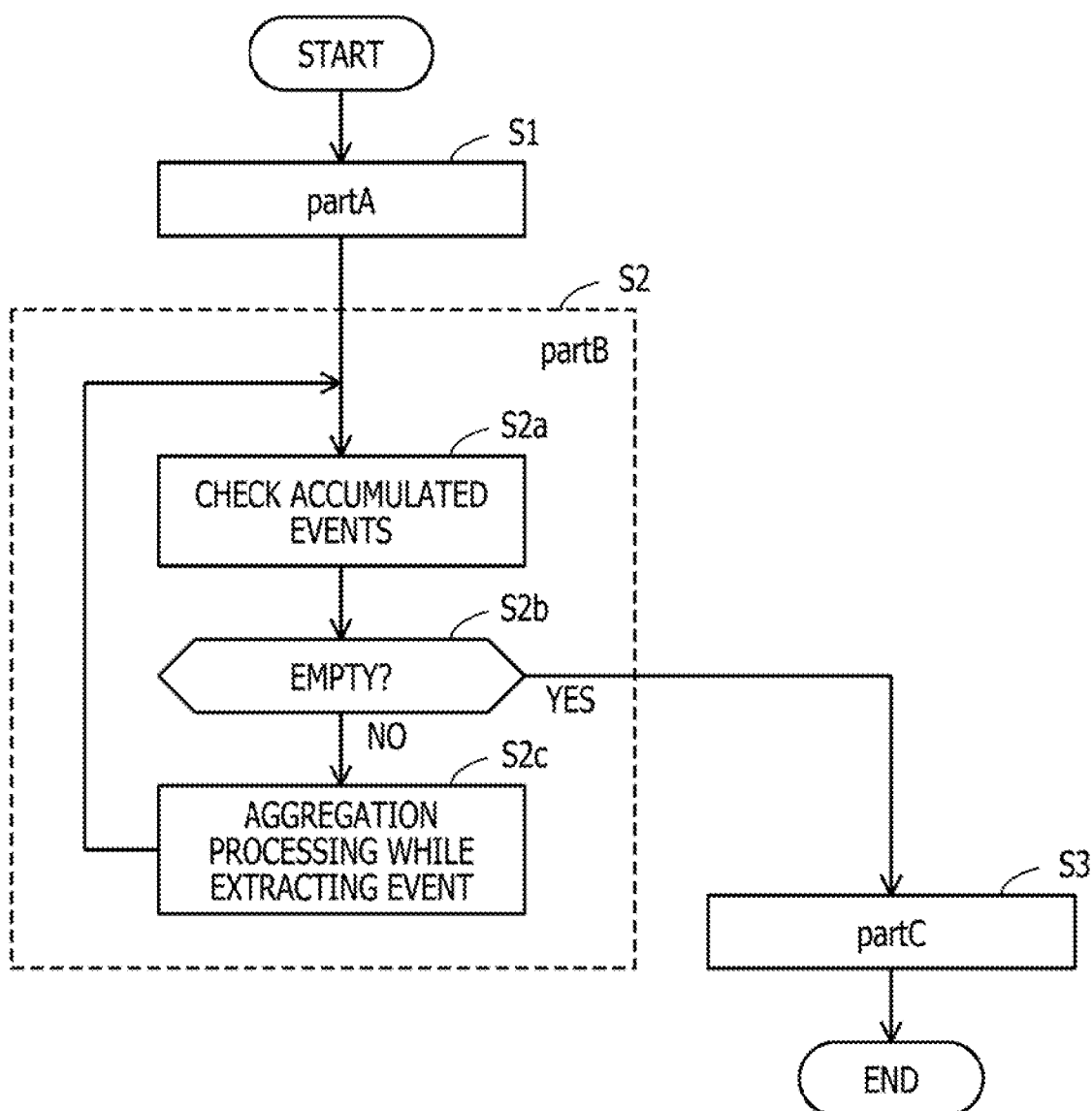
FIG. 21 illustrates an example of a task according to a fifth embodiment.

FIG. 21 illustrates an example of the task according to the fifth embodiment.

For example, the entire flow of the task before the arrangement includes the aforementioned steps S1, S2, and S3. Step S1 corresponds to aggregation pre-processing part A. Step S2 corresponds to aggregation processing part B. Step S3 corresponds to aggregation post-processing part C.

Step S2 further includes sub-steps S2a, S2b, and S2c.

Sub-step S2a is a step of checking the accumulated events which are accumulated in the RAM 102, the HDD 103, and the like.

Sub-step S2b is a step of determining whether or not the accumulated events are empty. The processing proceeds to step S3 when the determination in sub-step S2b turns out to be Yes. The processing proceeds to sub-step S2c when the determination in sub-step S2b turns out to be No.

Sub-step S2c is a step of carrying out aggregation processing while extracting one event. In sub-step S2c, the extracted event is deleted from the accumulated events. After sub-step S2c, the processing proceeds to sub-step S2a.

Figure 22:
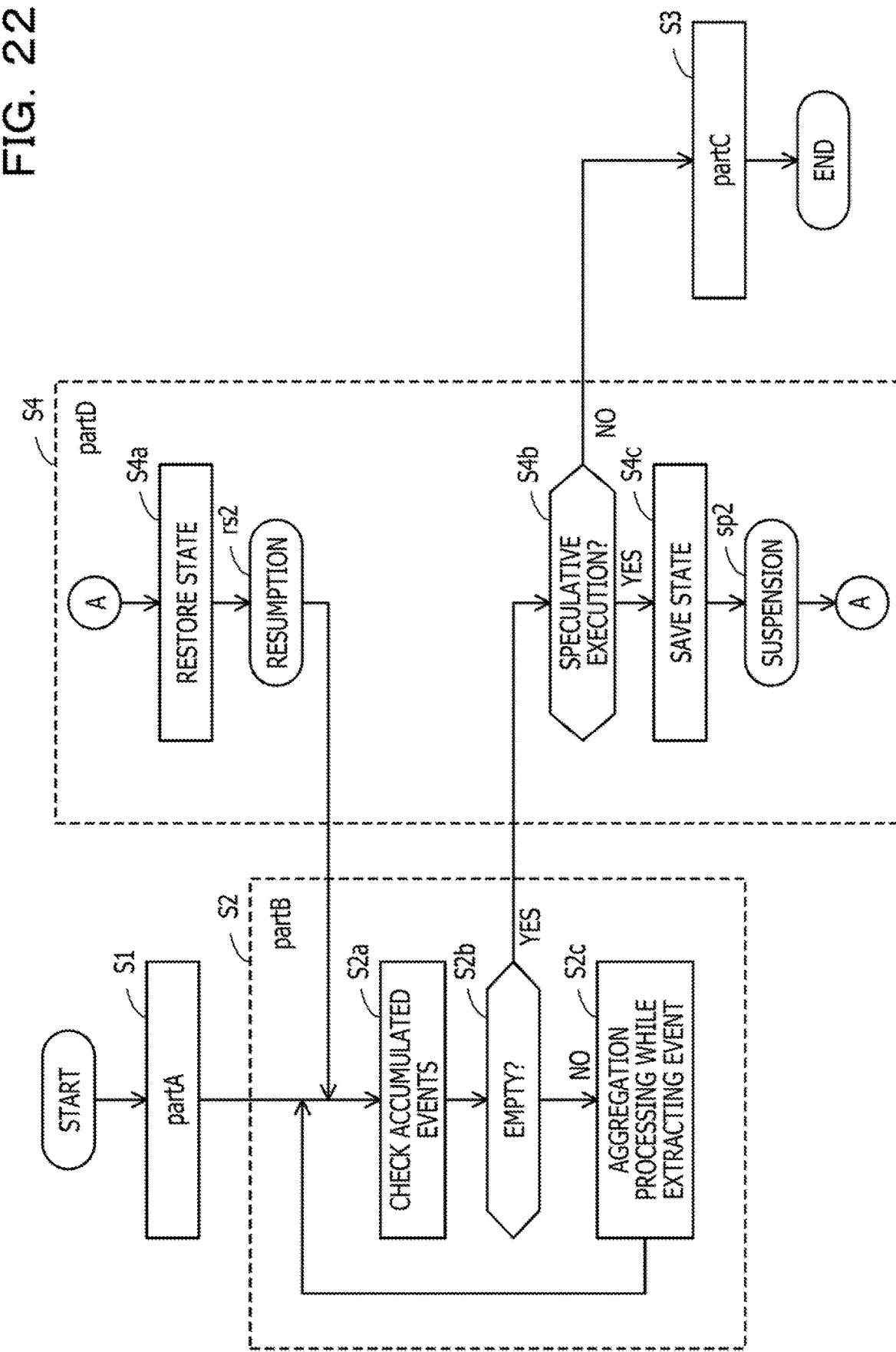
FIG. 22 illustrates an example of arranging a task.

FIG. 22 illustrates an example of arranging the task.

For example, the task execution management unit 125 inserts suspension/resumption processing part D to a timing immediately before the aggregation post-processing part C. In the case of speculative execution, the suspension/resumption processing part D saves the state of the task at that time point in the storage unit 110 and suspends the task. In the case of execution at the designated time, the suspension/resumption processing part D proceeds to execution of the aggregation post-processing part C. There may be two or more types of the aggregation post-processing part C. When there are two or more types of the aggregation post-processing part C, the task execution management unit 125 inserts the suspension/resumption processing part D to each type of the aggregation post-processing part C. The task execution management unit 125 may provide a single type of the suspension/resumption processing part D for a certain task and insert a code to the suspension/resumption processing part D. Here, the code indicates transfer of control to each of the types of the aggregation post-processing part C.

Step S4 corresponding to the suspension/resumption processing part D is inserted between step S2 and step S3.

Step S4 includes sub-steps S4a, rs2, S4b, S4c, and sp2.

Sub-step S4a is a step of restoring the saved state of the task. Sub-step rs2 is executed subsequent to sub-step S4a. Sub-step rs2 corresponds to resumption of the task. As a consequence of this resumption, the task is resumed from sub-step S2a.

Sub-step S4b is executed when the determination in sub-step S2b turns out to be Yes. Sub-step S4b corresponds to determination as to whether or not execution of the present task is speculative execution. The processing proceeds to sub-step S4c when it is speculative execution. The processing proceeds to step S3 when it is not speculative execution, or when it is execution at the designated time, for example.

Sub-step S4c is a step of saving the state of the task in the storage unit 110.

Sub-step sp2 is executed subsequent to sub-step S4c. Sub-step sp2 corresponds to suspension of the task. The processing proceeds to sub-step S4a at the time of next resumption of the task.

The speculative execution management unit 127 checks whether or not the task targeted for execution is suspendable/resumable. For example, the speculative execution management unit 127 may make an inquiry to the task information management unit 129 about suspendability/resumability of the tasks In response to the inquiry, the task information management unit 129 may answer to the speculative execution management unit 127 whether or not the task is suspendable/resumable with reference to an execution suspension availability management table to be discussed below. The speculative execution management unit 127 notifies the task execution management unit 125 of the task targeted for speculative execution as well as the suspendability/resumability of the task.

FIG. 23 illustrates an example of the execution suspension availability management table.

An execution suspension availability management table 118 is stored in the storage unit 110 in advance. The execution suspension availability management table 118 includes items of task and suspension/resumption availability. The identification information on the task is registered on the item of task. Information indicating whether or not the task is suspendable/resumable is registered on the item of suspension/resumption availability.

For example, a record including the task "Task 1" and the suspension/resumption availability "available" is registered with the execution suspension availability management table 118. This record indicates that the task "Task 1" is suspendable/resumable.

A record including the task "Task 2" and the suspension/resumption availability "not available" is also registered with the execution suspension availability management table 118. This record indicates that the task "Task 2" is not suspendable/resumable.

The suspension/resumption availabilities of other tasks are also registered with the execution suspension availability management table 118 likewise.

FIG. 24 illustrates an example of a speculatively executed task management list.

A speculatively executed task management list 119 is stored in the storage unit 110, updated by the task execution management unit 125, and used for management of the state of each task. The speculatively executed task management list 119 includes items of task and state. The identification information on the task is registered on the item of task. The state of the task is registered on the item of state.

For example, a record including the task "Task 1" and the state "state data d1" is registered with the speculatively executed task management list 119. This record indicates that task "Task 1" is suspended due to speculative execution and the state of the task is saved as the state data d1.

The states of other tasks are also registered with the speculatively executed task management list 119 likewise.

Next, procedures of speculative task execution by the server 100 according to the fifth embodiment will be described.

Figure 25:
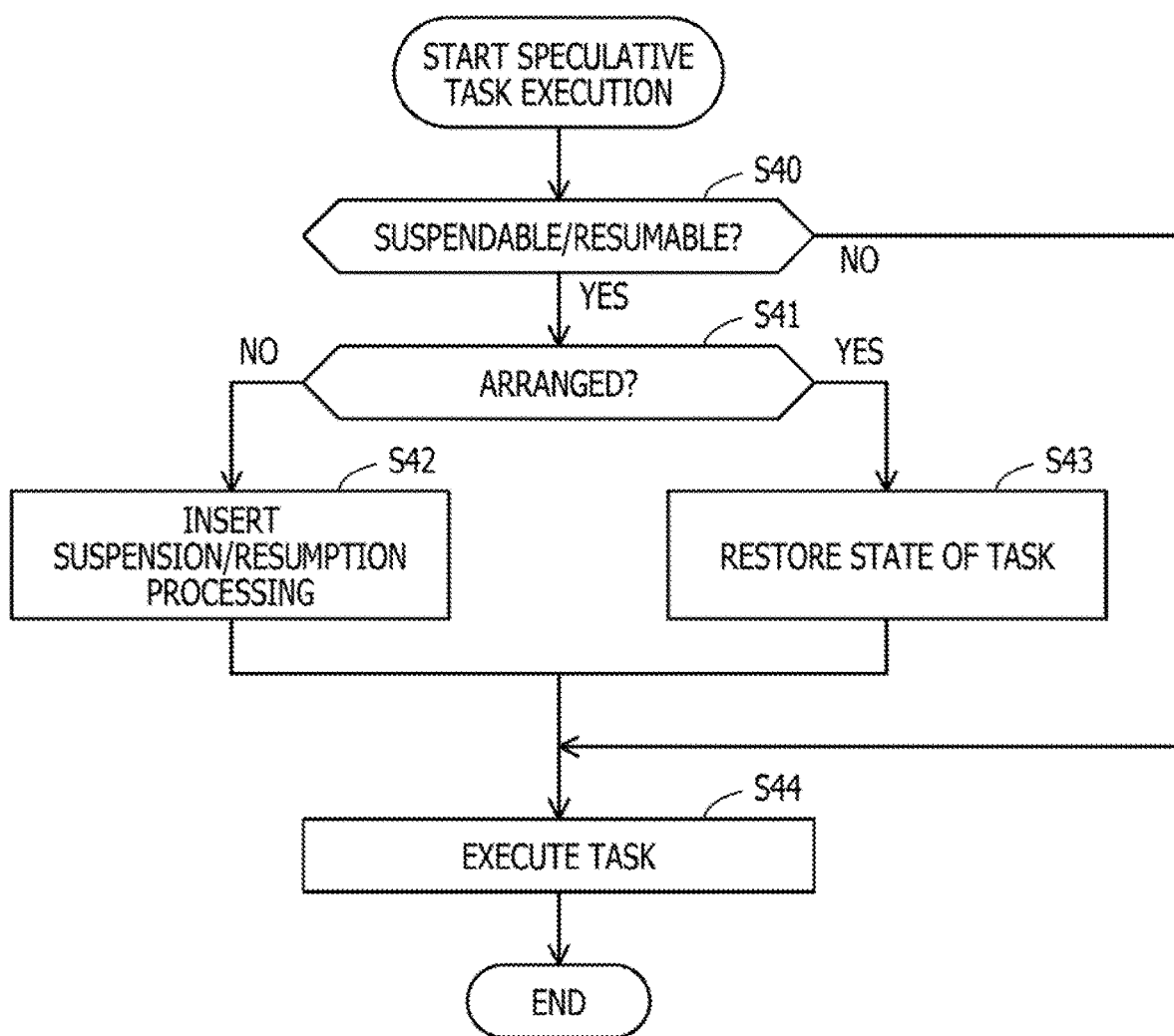
FIG. 25 is a flowchart illustrating an example of speculative task execution.

FIG. 25 is a flowchart illustrating an example of speculative task execution.

The following procedures correspond to step S13 of FIG. 11 and step S33 of FIG. 19.

(S40) The speculative execution management unit 127 determines whether or not the task targeted for execution is suspendable/resumable. As mentioned above, the speculative execution management unit 127 is capable of determining whether or not the task is suspendable/resumable by making an inquiry to the task information management unit 129. The processing proceeds to step S41 when the task is suspendable/resumable. The processing proceeds to step S44 when the task is not suspendable/resumable.

(S41) The speculative execution management unit 127 determines whether or not the task has been arranged. The processing proceeds to step S42 when the task has not been arranged. The processing proceeds to step S43 when the task has been arranged. The task which has been arranged means that the suspension/resumption processing has been inserted into the task. For example, the speculative execution management unit 127 determines whether or not the task has been arranged based on the speculatively executed task management list 119. The task has been arranged when the task is included in the speculatively executed task management list 119. The task has not been arranged yet when the task is not included in the speculatively executed task management list 119.

(S42) The speculative execution management unit 127 notifies he task execution management unit 125 of the task targeted for speculative execution and also notifies the task execution management unit 125 of the suspendability/resumability of the task. The task execution management unit 125 arranges insertion of the suspension/resumption processing into the task, and forwards the arranged task to the task execution unit 126. The task execution management unit 125 registers the task with the speculatively executed task management list 119, The processing proceeds to step S44.

(S43) The speculative execution management unit 127 notifies the task execution management unit 125 of the task targeted for speculative execution and notifies the task execution management unit 125 of the fact that the task has been arranged (for example the task is in the suspended state). The task execution management unit 125 obtains the state data of the task from the speculatively executed task management list 119 and restores the corresponding state of the task. The task execution management unit 125 forwards the task (the arranged task) to the task execution unit 126.

(S44) The task execution unit 126 executes the task acquired from the task execution management unit 125. When the determination turns out to be No in step S40, the task to be executed is an unarranged task. When the determination turns out to be Yes in step S40 and the processing undergoes step S42 or S43, the task to be executed is the arranged task. For example, when the processing undergoes step S43, the task is executed in the restored state. After the aggregation processing by the task, the task execution unit 126 registers the state data with the speculatively executed task management list 119 and suspends the task. The speculative task execution is then terminated.

As described above, the task execution management unit 125 saves the state of the task after starting speculative execution of the task at certain time and then suspends execution of the task. Thereafter, the task execution management unit 125 restores the state of the task either at the designated time or at the time earlier than the designated time, and resumes execution of the task from a second sub-task in the task.

For example, the task execution management unit 125 inserts the suspension/resumption processing to the task targeted for speculative execution, thus enabling the suspension/resumption even when the task does not include the suspension/resumption processing.

In the case of re-executing the task, it is possible to execute the task from the restored state. For this reason, the task does not have to be redone for all the events targeted for aggregation. Thus, it is possible to reduce the load associated with re-execution of the task. This also increases time ranges when the system load on the server 100 falls below the load threshold Lr. Thus, it is possible to expand opportunities for speculative execution. As a consequence, it is possible to reduce the peak load on the system more at the designated time and thus to level out the system load at each clock time.

The information processing of the first embodiment may be realized by causing the processing device 12 to execute a program. The information processing of the second to fifth embodiments may be realized by causing the CPU 101 to execute a program. The programs may be recorded in a computer-readable recording medium 33.

For example, the program may be circulated by distributing the recording medium 33 that records the program. The program may be stored in another computer and the program may be distributed through a network. For example, the computer may store (install) the program recorded in the recording medium 33 or the program received from another computer in the storage device such as the RAM 102 or the HDD 103, read the program from the storage device, and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
a memory configured to store schedule information indicating a first clock time scheduled for execution of a task; and
processor circuitry coupled to the memory, the processor circuitry being configured to:
in a case where a system load of the information processing system is smaller than a threshold, select the task as a target for a speculation execution;
in response to the selecting of the task as the target for the speculation execution, execute the task by using data corresponding to the task, at a second clock time that is earlier than the first clock time indicated in the schedule information;
in a case where the data used in the task is not updated in a period from the second clock time to the first clock time, control, by the processor circuitry, the executing of the task not to execute the task at the first clock time; and
in response to detecting that the data used in the task is updated in the period from the second clock time to the first clock time, control, by the processor circuitry, the executing of the task to re-execute the task.

2. The information processing system according to claim 1, wherein the processor circuitry is configured to determine, as the second clock time, time when a load on the information processing system is lower than a threshold.

3. The information processing system according to claim 1, wherein the processor circuitry is configured to:
determine, for each of a plurality of a tasks, a priority based on a probability that the data corresponding to the each of the plurality of tasks is updated in the period from the second clock time to the first clock time; and
in response to detecting of amounting to the second clock time, execute a task selected from among the plurality of task, the selected task being a task having the probability lower than other tasks among the plurality of tasks.

4. The information processing system according to claim 3, wherein the processor circuitry is configured to determine, based on an attribute of a time range to which the second clock time belongs, the probability that the data corresponding to the task is updated in the period from the second clock time to the first clock time.

5. The information processing system according to claim 1, wherein the processor circuitry is configured to:
calculate, for each task of a plurality of tasks, priority of the each task by using a probability that data corresponding to the each task is updated in a period from the second clock time to the first clock time and using an amount of resources to be used by execution of the each task, and determine, based on the priority of each of the plurality of tasks, from among the plurality of tasks a task to be executed at the second clock time.

6. The information processing system according to claim 1, wherein the processor circuitry is configured to:

specify, among a plurality of the tasks, a set of tasks such that a sum of amounts of resources to be used by execution of the set of tasks becomes smaller than a predetermined permissible amount, and in response to detecting of amounting to the second clock time, execute the specified set of tasks.

7. The information processing system according to claim 1, wherein the processor circuitry is configured to after the processor circuitry starts execution of the task at the second clock time, save a state of the task and suspends execution of the task, after the suspending of the execution of the task, restore the state of the task, and resume execution of the task.

8. A method implemented by a computer, the method comprising:

obtaining, by processor circuitry of the computer, schedule information stored in a memory of the computer, the schedule information including a first clock time scheduled for execution of a task;

in a case where a system load of the information processing system is smaller than a threshold, selecting the task as a target for a speculation execution;

in response to the selecting of the task as the target for the speculation execution, executing, by the processor circuitry of the computer, the task by using data corresponding to the task, at a second clock time that is earlier than the first clock time indicated in the schedule information;

in a case where the data used in the task is not updated in a period from the second clock time to the first clock time, controlling, by the processor circuitry of the computer, the executing of the task not to execute the task at the first clock time; and in response to detecting that the data used in the task is updated in the period from the second clock time to the first clock time, controlling, by the processor circuitry of the computer, the executing of the task to re-execute the task.

9. A non-transitory computer-readable storage medium for storing a program which causes a computer to perform processing, the processing comprising:

obtaining, by processor circuitry of the computer, schedule information stored in a memory of the computer, the schedule information including a first clock time scheduled for execution of a task;

in a case where a system load of the information processing system is smaller than a threshold, selecting the task as a target for a speculation execution;

in response to the selecting of the task as the target for the speculation execution, executing, by the processor circuitry of the computer, the task by using data corresponding to the task, at a second clock time that is earlier than the first clock time indicated in the schedule information;

in a case where the data used in the task is not updated in a period from the second clock time to the first clock time, controlling, by the processor circuitry of the computer, the executing of the task not to execute the task at the first clock time; and in response to detecting that the data used in the task is updated in the period from the second clock time to the first clock time, controlling, by the processor circuitry of the computer, the executing of the task to re-execute the task.

* * * * *